US011997355B2

(12) United States Patent
Parker

(10) Patent No.: US 11,997,355 B2
(45) Date of Patent: *May 28, 2024

(54) APPARATUS, SYSTEMS AND METHODS FOR MEDIA CONTENT EVENT QUICK ACCESS QUEUE

(71) Applicant: DISH Technologies L.L.C., Englewood, CO (US)

(72) Inventor: Scott Parker, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,650

(22) Filed: Apr. 6, 2022

(65) Prior Publication Data

US 2022/0232291 A1    Jul. 21, 2022

Related U.S. Application Data

(63) Continuation of application No. 15/431,009, filed on Feb. 13, 2017, now Pat. No. 11,303,964.

(51) Int. Cl.
*H04N 21/472* (2011.01)
*H04N 21/431* (2011.01)
(Continued)

(52) U.S. Cl.
CPC ... *H04N 21/47202* (2013.01); *H04N 21/4312* (2013.01); *H04N 21/4532* (2013.01);
(Continued)

(58) Field of Classification Search
CPC ....................................................... H04N 21/20
See application file for complete search history.

(56) References Cited

U.S. PATENT DOCUMENTS 8,782,712 B2    7/2014  Mehta et al.
8,966,521 B2    2/2015  Sounararajan et al.
(Continued)

OTHER PUBLICATIONS

Newman, Jared, "Forget Universal Search; Give Me a Universal Watch List," http://www.techhive.com/article/2984890/streaming-media/forget-universal-search-give-me 3-universal-watch-list.html, Sep. 24, 2015, 2 pages.

(Continued)

*Primary Examiner* — Mushfikh I Alam
(74) *Attorney, Agent, or Firm* — Kilpatrick Townsend & Stockton LLP

(57) ABSTRACT

Media content event access systems and methods are operable to indicate media content event access options. An exemplary embodiment presents a first listing that indicates a plurality of user-specified media content events of a user's watch list, receives user input corresponding to a selection of one of the user-specified media content events indicated on the first listing, presents a second listing indicating access information, wherein the second listing presents access information that informs the user of at least one access option that may be selected by the user to cause the media device to access the selected one of the plurality of user-specified media content events, and wherein the second listing presents content attribute information that informs the user of at least one attribute of the selected one of the plurality of user-specified media content events that is provided by the associated content source.

20 Claims, 5 Drawing Sheets

(51) Int. Cl.
*H04N 21/45* (2011.01)
*H04N 21/462* (2011.01)
*H04N 21/482* (2011.01)

(52) U.S. Cl.
CPC ... *H04N 21/4622* (2013.01); *H04N 21/47214* (2013.01); *H04N 21/4821* (2013.01); *H04N 21/4826* (2013.01)

(56) References Cited

U.S. PATENT DOCUMENTS

| | | | |
|---|---|---|---|
| 8,969,534 | B2 | 2/2015 | Williams et al. |
| 9,071,796 | B2 | 6/2015 | McCausland |
| 9,110,954 | B2 | 8/2015 | Shen et al. |
| 9,258,609 | B2 | 2/2016 | Adryna et al. |
| 11,303,964 | B2 | 4/2022 | Parker |
| 2002/0166121 | A1 | 11/2002 | Rovira |
| 2003/0005445 | A1 | 1/2003 | Schein et al. |
| 2003/0093790 | A1 | 5/2003 | Logan et al. |
| 2004/0154040 | A1 | 8/2004 | Ellis |
| 2004/0216156 | A1* | 10/2004 | Wagner .......... H04N 21/482 725/39 |
| 2004/0268403 | A1* | 12/2004 | Krieger ........ H04N 21/4667 725/39 |
| 2005/0002638 | A1 | 1/2005 | Putterman et al. |
| 2005/0102696 | A1* | 5/2005 | Westberg ...... H04N 21/44224 725/9 |
| 2005/0246739 | A1* | 11/2005 | Davidson ........... H04N 21/47 348/E7.071 |
| 2006/0037043 | A1 | 2/2006 | Kortum et al. |
| 2006/0206912 | A1 | 9/2006 | Klarfeld et al. |
| 2007/0219984 | A1 | 9/2007 | Aravamudan et al. |
| 2007/0250861 | A1* | 10/2007 | Angiolillo ...... H04N 21/43615 725/35 |
| 2008/0092159 | A1 | 4/2008 | Dmitriev et al. |
| 2009/0031345 | A1* | 1/2009 | Vagnati ........ H04N 21/6581 725/39 |
| 2009/0133073 | A1 | 5/2009 | DaLaCruz et al. |
| 2009/0249419 | A1 | 10/2009 | Kahn et al. |
| 2010/0275233 | A1 | 10/2010 | Soohoo et al. |
| 2011/0107374 | A1* | 5/2011 | Roberts ........ H04N 21/6582 725/50 |
| 2012/0079429 | A1 | 3/2012 | Stathacopoulos et al. |
| 2012/0221498 | A1 | 8/2012 | Kaszynski et al. |
| 2012/0260291 | A1 | 10/2012 | Wood |
| 2012/0311068 | A1* | 12/2012 | Gladwin ............ H04L 65/00 709/214 |
| 2013/0139206 | A1 | 5/2013 | Benardeau et al. |
| 2013/0167168 | A1 | 6/2013 | Ellis et al. |
| 2014/0223480 | A1* | 8/2014 | Berry .............. H04N 21/4826 725/40 |
| 2014/0245222 | A1 | 8/2014 | Kovacevic et al. |
| 2014/0259037 | A1* | 9/2014 | Belyaev .......... H04N 21/4622 725/14 |
| 2015/0382031 | A1* | 12/2015 | Truong .......... H04N 21/64753 725/86 |
| 2016/0188286 | A1 | 6/2016 | Greene |
| 2017/0048476 | A1* | 2/2017 | Freiin von Kapri ........ H04N 21/43615 |
| 2017/0085940 | A1 | 3/2017 | Innes et al. |
| 2017/0244802 | A1* | 8/2017 | VanBlon ............ H04L 65/80 |
| 2018/0035142 | A1 | 2/2018 | Rao et al. |
| 2018/0146253 | A1 | 5/2018 | Louboutin |

OTHER PUBLICATIONS

Apple tvOS, https://www.apple.com/tvos/, 8 pages.
"Single Queue for Multiple Streaming Video Services," http://superuser.com/questions/997769/single-queue-for-multiple-streaming-video-services, Nov. 9, 2015, 1 page.
Mayo, Benjamin, "Feature Request: Apple TV 4 need a way to watch TV shows from multiple sources in one universal app,"https://9to5mac.com/2016/01/18/feature-request-apple-tv-4-needs-a-way-to-watch-tv-shows-from-multiple-sources-in-one-universal-app/comment-page-1/, Jan. 18, 2016, 20 pages.
Fitzpatrick, Jason, "How to save video to plex for later viewing," http://www.howtogeek.com/268792/how-to-save-video-to-plex-for-later-viewing/, Jun. 20, 2016, 3 pages.
DirecTV App, http://www.directv.com/technology/mobile_apps/directv_app, 2016, 4 pages.
"How to Remove a Movie From a Netflix Queue," https://www.techwalla.com/articles/how-to-remove-a-move-from-a-netflix-queue, 2016, 2 pages.

* cited by examiner

APPARATUS, SYSTEMS AND METHODS FOR MEDIA CONTENT EVENT QUICK ACCESS QUEUE

CROSS-REFERENCE TO RELATED APPLICATION

This application is a continuation of U.S. patent application Ser. No. 15/431,009, filed on Feb. 13, 2017, entitled "Apparatus, Systems and Methods for Media Content Event Quick Access Queue," the entire disclosure of which is hereby incorporated by reference, for all purposes, as if fully set forth herein.

BACKGROUND OF THE INVENTION

Media devices, such as a set top box, a stereo, a television, a computer system, a game system, or the like, are often configured to receive broadcasting media content over a communication system. The media content is provided to such media devices using a predefined content format, which may be optionally encrypted. Such broadcasted media content must be viewed by the user of the media device as it is received in the broadcasted communication medium, or electronically saved into a memory medium for later viewing.

The media content typically comprises video content, audio content, and other information of interest such as closed stream captioning information and/or information describing attributes pertaining to the media content. The video portion of the media content, when decoded and presented on a display, presents a series of sequentially presented still images which are each presented for some predefined duration. By presenting each image for a short duration, the sequentially presentation of the series of images results in the perception by a viewer of a motion picture (interchangeably referred to herein as a video). The corresponding audio portion of the media content is presented in synchronism with presentation of the video such that the user hears sounds, such as actor dialogue and/or music, while they are viewing the video portion of the media content.

The streaming media content (interchangeably referred to herein as a media content stream) includes a series of media content events. Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In a broadcast environment, the media content event is broadcast by a broadcast content provider to a plurality of media devices as a stream of media content residing in the media content stream. Typically, at any given instant in time, the media device may be receiving hundreds of, or even thousands of, concurrently broadcasting media content streams each with one or more streaming media content events. Broadcast and presentation of a media content event occurs over some time span (duration). Thus, the media content event has a beginning portion that usually includes identifying information about the media content event, such as music, text of a title, or other information. When the user views this beginning portion of the media content event, the user intuitively understands that they are viewing the beginning of the media content event. This identifying information is also electronically included in the media content stream to identify a particular media content event and may reside in meta data or the like.

As time progresses, the entirety of the streaming media content event of interest is broadcast and/or is presented to the user as the stream of media content is being received in the media content stream. At some point, the media content event of interest comes to its end (conclusion). A viewing user intuitively understands that the media content event of interest is ending upon viewing the concluding portion of the media content event. Such concluding portions of the media content event typically include the closing credits portion, wherein the closing credits is visible to the user. Typically, when the user is viewing a live broadcast of the media content event, a next media content event begins after the conclusion of the media content event of interest. Alternatively, one or more commercials or the like may next be presented to the user prior to the initial presentation of the next live broadcast media content event (assuming that the user chooses to view that next media content event).

To facilitate informing the user of the particular broadcasting media content events that are currently available in the broadcasting media content streams, the media device is configured to generate and present an electronic program guide (EPG) on the display to a viewing user. The EPG is a type of a user interface that presents a menu, or a series of menus, that describe available media content events that are available for presentation. The EPG has the look and feel of a table that uses a combination of text and/or symbols to indicate the media content event viewing choices that may be selected by the user. The media content event information presented on the EPG may include the title of available program, the "channel" of the available program, the scheduled broadcast start time, the scheduled broadcast end time, the date of presentation, and optionally some amount of supplemental information (such as a brief description of the media content event). The EPG is interactive with the user. The user, by actuating one or more of the controllers 150 on their remote control 148, is able to "scroll" or "navigate" about the EPG to select a media content event of interest. Accordingly, when viewing the EPG, the user is able to select a currently received live broadcast media content event for presentation.

Often, the user is interested in a particular media content event that is not currently broadcasting. In the event that the particular media content event of interest is scheduled for a future broadcast, the scheduled broadcast times and providing channels of the media content event are indicated on the EPG. If the user is able to identify the scheduled broadcast of the media content event of interest on the EPG (after a manual search using one or more EPG search tools), the user is able to schedule that particular media content event of interest for presentation and/or recording into a digital video recorder when the media content event of interest is broadcast. If the media content event of interest is automatically recorded (saved into a recording device) when it is broadcast, the user is able to later watch the recorded media content event of interest at a later time of their choosing.

However, the user may not be able to find a particular media content event of interest on the EPG using the EPG search tools or by using a manual search process. Further, even if the particular media content event of interest is scheduled for future broadcast, the media content event of interest may not be indicated on the EPG in view of the limited future time span that an EPG encompasses, which is typically limited to one or two weeks in advance of the current date.

Alternatively, the media content event of interest may be available at the media device through a video on demand (VOD) provider system. The VOD content provider system is configured to access and then stream the media content event of interest to the media device in response to a request initiated by the user. Typically, a VOD content provider operating such VOD content provider systems charge a fee for access to a particular media content event. Alternatively, or additionally, the VOD content provider system may be available only to those users who have paid a premium subscription fee for access to the particular VOD content provider system that has the media content event of interest available for on-demand viewing. The VOD content provider may provide access to their VOD content provider system via the broadcast provider, and/or may provide access to their VOD content provider system via a communication system, such as the Internet or the like.

Alternatively, or additionally, some VOD content providers may not charge an access fee, but may instead interleave various commercials into the streaming media content. Thus, the user is required to view the commercials along with their requested media content event of interest. Such VOD content provider systems may disable various trick functions, such as fast forward operations, so as to force the user to view the commercials.

If the particular media content event of interest is available on one or more VOD systems, the user must manually search the electronic data base (that is, the content catalogue) of each VOD content provider to ascertain whether the particular media content event of interest is available from the VOD system. Searching through several different VOD systems can be time consuming for the user.

In some instances, the particular media content event of interest may, at some point in time, become available on a memory medium that the user can obtain. The physical memory medium is played be an external device that is couplable to the media device. An example memory medium is a digital video disc (DVD). Any suitable memory medium may be used to store a media content event. The user simply needs to physically obtain a copy of the memory medium or DVD, such as by purchasing or renting, and then play the media content event of interest on a suitable external device that is communicatively coupled to the media device (such as a DVD player that plays a DVD). In some situations, the memory medium or DVD may be available at a retail outlet, such as a retailer, a movie store or a kiosk. Alternatively, the memory medium or DVD may be available from a provider via a mail or postal service.

In addition to the time-consuming effort required to identify a particular media content event of interest that may be accessible by the media device is the additional difficulty encountered by users in locating the particular media content event of interest from a particular source that they are willing to use. For example, the user may not be willing to pay a premium charge to access the media content event of interest on a pay-per-view based VOD system but would rather prefer to wait for the media content event of interest to become available for free during a broadcast of the media content event of interest. As another example, the user may prefer a DVD format over a format used by a VOD access system. As yet another example, the user may have access to a first premium service VOD content provider who does not yet have the media content event of interest available on their particular VOD system, while another VOD content provider that the user has not subscribed to does have that particular media content event of interest currently available on their VOD. One skilled in the art appreciates that in view of the numerous content access alternatives available to the user, that keeping track of the content access options that the user has to access a particular media content event of interest may become rather complex and difficult to manage.

Various user-assistance schemes have been developed to assist the user to identify available media content events of interest that the user may access through their media device. The broadcast content provider managing the broadcasting system used by the user's media device typically has a search-based system that permits the user to search for a particular media content event of interest based on its title. Or, the search system may be based on some other characteristic of the media content event, such as by a genre that is associated with the media content event of interest (action, science fiction, comedy, etc.), a particular actor name, production date or the like.

Additionally, each individual VOD content provider typically has a unique proprietary search and media content event listing system that is searchable by the user to indicate the available media content events that are available on that particular VOD content provider system. Such proprietary search and media content event listing system may be available to the media device via the broadcast content provider managing the broadcasting system used by the user's media device. Alternatively, or additionally, the individual VOD content provider may provide access to their proprietary search and media content event listing system via a communication system, such as the internet or the like.

Similarly, providers of content on a physical media may also have a proprietary search and media content event listing system that lists available media content events that are stored on physical media. In some proprietary search and media content event listing systems, the user may be able to reserve a particular media content event of interest, if available, for later pick up. Alternatively, or additionally, the proprietary search and media content event listing system may permit the user to order the media content event of interest for delivery to their residence or other predefined address.

Various other user assistance tools have been developed to facilitate the monitoring of media content event availability. A non-limiting exemplary system is described in U.S. patent application Ser. No. 12/609,302 to Roberts et al., published as U.S. publication 2011/0107374, which is incorporated herein by reference in its entirety. The Roberts et al. system describes a watch list maintenance facility that maintains media content watch list data that may include identifiers, titles, descriptions or the like of media content instances (that is, a media content event) that are available to a user. A watch list user interface is provided that lists media content instances identified by a user. The watch list interface indicates various information pertaining to each listed media content instance. The user may, in some situations, even download a particular listed media content instance from the indicated provider via the watch list user interface. Further, the Roberts et al. watch list data may be updated based on a variety of events.

However, the availability of a particular media content event of interest that is concurrently available from a plurality of different content providers adds an unexpected layer of complexity to the problem of keeping track of a list of user-specified media content events of interest. The particulars of the media content event of interest from each different provider are likely different. For example, the cost to access a particular media content event of interest may vary from provider to provider. The media content event of interest may be available during a future broadcast for later recording and/or viewing (interchangeably referred to herein as presentation), or, the same media content event of interest may be available for immediate presentation via one or more VOD systems.

Accordingly, there is a need in the arts to provide a more comprehensive system and method of indicating the availability of a particular media content event of interest to a user, and to indicate to the user the various conditions upon which each content provider makes that particular media content event available. Further, there is a need in the arts to provide an effective and convenient way for the user, once the user has identified a preferred content provider of a particular media content event of interest based on their preferences, to have select the media content event of interest for delivery to their media device.

BRIEF SUMMARY

Systems and methods of indicating media content event access options that may be used by a media device to access at least one user-specified media content event are disclosed. An exemplary embodiment presents a first listing that indicates a plurality of user-specified media content events of a user's watch list, receives user input corresponding to a selection of one of the user-specified media content events indicated on the first listing, presents a second listing indicating access information, wherein the second listing presents access information that informs the user of at least one access option that may be selected by the user to cause the media device to access the selected one of the plurality of user-specified media content events, and wherein the second listing presents content attribute information that informs the user of at least one attribute of the selected one of the plurality of user-specified media content events that is provided by the associated content source.

BRIEF DESCRIPTION OF THE DRAWINGS

Preferred and alternative embodiments are described in detail below with reference to the following drawings.

DETAILED DESCRIPTION

Figure 1:
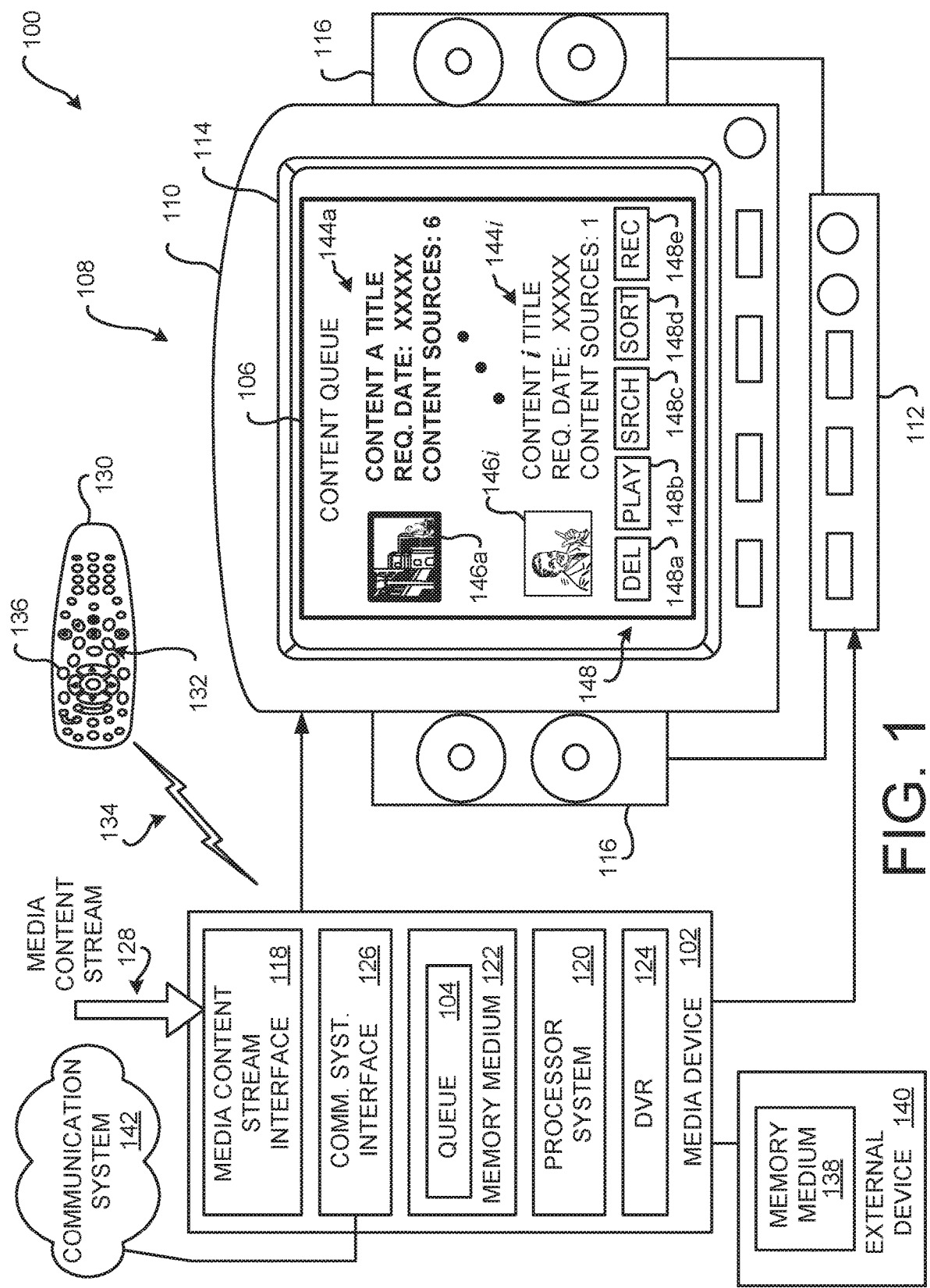
FIG. 1 is a block diagram of an embodiment of a media content event quick access queue system implemented in a media device.

FIG. 1 is a block diagram of an embodiment of a media content event quick access queue system 100 implemented in a media device 102, such as, but not limited to, a set top box (STB). Embodiments of the media content event quick access queue system 100 may be implemented in other media devices, such as, but not limited to, a stereo, a surround-sound receiver, a radio, a television (TV), a digital video disc (DVD) player, a digital video recorder (DVR), a game playing device, or a personal computer (PC) that is configured to receive and to facilitate presentation of a media content event of interest.

Embodiments of the media content event quick access queue system 100 are configured to receive a user specification that identifies a media content event of interest that the user is interested in viewing. In response to the user specification, information associated with and that identifies the specified media content event of interest is added into a media content event queue data 104. The information of the media content event queue data 104 (interchangeably referred to herein as the "queue 104") is managed by embodiments of the media content event quick access queue system 100 using any suitable database format such as a list, catalogue or the like. The information residing in the media content event queue data 104 is described below in greater detail.

The information in the media content event queue data 104 is used to generate a graphical user interface (GUI) content queue 106 (interchangeably referred to herein as a "watch list" that is a first listing of a plurality of user-specified media content events).

The example first page of the content queue 106, when presented to the user, lists information identifying their selected media content events of interest. The content queue 106 further identifies one or more content providers that have the media content event of interest available to the media device 102 and identifies various access conditions under which each of the indicated media content events of interest are available from each of the plurality of different content providers.

In some situations, the user may be interested in immediately viewing the specified media content event of interest indicated in the content queue 106 or the user may be interested in later viewing the indicated media content event of interest. The content queue 106 provides a mechanism wherein the user may select one of the indicated media content events for immediate presentation and/or for recording.

For example, a particular indicated media content event of interest may be immediately available from a first VOD content provider for a premium fee (typically, using a commercial-free high-definition format). Alternatively, the indicated media content event of interest may be immediately available from a second VOD content provider for free, though with commercials interleaved throughout the media content event of interest such that the user must view the commercials (typically, with trick function operations disabled). Alternatively, the indicated media content event of interest may be available to the user on a physical medium, such as a DVD or the like, from a third provider at a specified future date. And, as yet another alternative, the indicated media content event of interest may be available from fourth VOD content provider for free at some specified future date.

Since the content queue 106 is configured to indicate all of the media content event access options to the user, the user may make an informed choice as to how their media device 102 is to access the indicated media content event of interest. For example, the user may choose to immediately view the indicated media content event of interest from the first VOD content provider by paying the premium fee. Alternatively, the user may choose to immediately view the free version of the indicated media content event of interest (that includes the commercials that must also be viewed). Alternatively, the user may simply wait for the indicated media content event of interest to become available under free access conditions at a future date, such as when the indicated media content event of interest is broadcast for free to the public or is available as part of a premium content service that the user has subscribed to. Since the media content event quick access queue system 100 updates the content queue 106, the user will always be able to appreciate the most current access information for the indicated media content events of interest.

As another non-limiting example, the indicated media content event of interest may be a newly released movie that is not yet available for access at the media device 102 since the indicated media content event of interest is currently available only in theatres. At some later time, one or more content providers may have the user-specified media content event of interest available for access by the media device 102. When the indicated media content event of interest finally becomes available to the media device 102, the content queue 106 is updated and then indicates to the user the availability of and the access conditions for the user-specified media content event of interest that is indicated on the presented content queue 106.

The exemplary media device 102 is communicatively coupled to a media presentation system 108 that includes a visual display device 110, such as a television (hereafter, generically a TV), and an audio presentation device 112, such as a surround sound receiver controlling an audio reproduction device. The video portion of a presenting media content event or a presented content queue 106 is presented to a user on a display 114 of the visual presentation device 110. The audio portion of a presenting media content event is reproduced as audible sounds by one or more speakers 116 of the audio presentation device 112. Other types of output devices may also be coupled to the media device 102, including those providing any sort of stimuli sensible by a human being, such as temperature, vibration and the like. In some embodiments, the media device 102 and one or more of the components of the media presentation system 108 may be integrated into a single electronic device.

The non-limiting exemplary media device 102 comprises a media content stream interface 118, a processor system 120, a memory medium 122, an optional digital video recorder (DVR) 124, and an optional communication system interface 126. Other media devices 102 may include some, or may omit some, of the above-described media processing components. In an example embodiment, the media content event queue data 104 resides in the memory medium 122. In other embodiments, the media content event queue data 104 may reside in a different memory medium that is resident or that is remote from the media device 102. Further, additional components of the media device 102 not described herein may be included in alternative embodiments.

The functionality of the media device 102, here a set top box, is now broadly described. In a satellite broadcast system (not shown), a media content broadcast provider provides media content that is received in one or more broadcasting multiple media content streams 128 multiplexed together in one or more transport channels. The transport channels with the media content streams 128 are communicated to the media device 102 from a media system sourced from a remote head end facility (not shown) operated by the media content broadcast provider. The media device 102 is configured to receive one or more broadcasted satellite signals detected by an antenna (not shown). Non-limiting examples of other media systems that broadcast a media content stream 128 include a cable system, a radio frequency (RF) communication system, and the Internet. Here, broadcasting refers to the process of communicating one or more media content streams 128 over a broadcast communication system (not shown) to a plurality of media devices 102 that are communicatively coupled to the broadcast communication system. Often, the media content is broadcast to hundreds of, or even thousands of, media devices 102 that concurrently receive the broadcasting media content stream(s) 128.

The one or more media content streams 128 are received by the media content stream interface 118. The media content streams 128 are processed in accordance with instructions received from the processor system 120. The processor system 120, based upon a request for a particular broadcasting media content event specified by a user, parses out media content associated with the specified media content event. The media content event is then assembled into a stream of video and/or audio information that is streamed out to components of the media presentation system 108, such as the visual display device 110 and/or the audio presentation device 112. Alternatively, or additionally, the parsed-out media content may be saved into the DVR 124 for later presentation. The DVR 124 may be directly provided in, locally connected to, or remotely connected to, the media device 102. In alternative embodiments, the media content streams 128 may be stored for later decompression, processing and/or decryption.

The exemplary media device 102 is configured to receive commands from a user via a remote control 130. The remote control 130 includes one or more controllers 132 disposed on the surface of the remote control 130. The user, by actuating one or more of the controllers 132, causes the remote control 130 to generate and transmit commands, via a wireless signal 134, to the media device 102. Preferably, each individual one of the controllers 132 has a specific predefined function that causes a specific operation by the media device 102 and/or by components of the media presentation system 108. The commands communicated from the remote control 130 then control the media device 102 and/or control components of the media presentation system 108. The wireless signal 134 may be an infrared (IR) signal or a radio frequency (RF) signal that is detectable by the media device 102.

A novel remote control includes at least one controller 136 that is configured to at least initiate operation of the media content event quick access queue system 100. In some embodiments, the controller 136 has a recognizable color, symbol or other marking that the user intuitively understands or remembers to be associated with managing their watch list. In an example embodiment, actuation of the controller 136 initiates presentation of the content queue 106 on the display 114. Alternatively, or additionally, actuation of the controller 136 when an EPG (not shown) is being presented on the display 114 may cause a currently focused to media content event to be added to the content queue 106. Multiple controllers 132 may be configured for operation of the media content event quick access queue system 100.

A media content event may be stored on a memory medium 138 that is communicatively couplable to an external device 140. An example memory medium 138 is a DVD, thought the media content event may be stored on any suitable memory medium. Another non-limiting example of a memory medium is a flash drive or uniform serial bus (USB) drive. The external device 140, such as a DVD player, is communicatively coupled to the media device 102. In operation, the media content event stored on the memory medium 138 is accessed by the external device 140 and is then streamed out as a media content stream to the media device 102. In some embodiments, the external device 140 may be integrated into the media device 102 as an internal component.

A media content event may also be available to the media device 102 from a remote site (not shown). The media device 102 communicatively couples to the remote site via a suitable communication system 142. The communication system interface 126 is configured to communicatively couple the media device to the communication system using a suitable wireless or wire-based connector and/or link. A non-limiting example of an external site is a VOD system (not shown) operated by a VOD content provider. Here, when the user requests a particular indicated media content event of interest, the media device 102 communicates a request for that indicated media content event the remote site. The remote site then streams the requested media content event, via the communication system 142, to the media device 102.

A simplified hypothetical content queue 106 is illustrated as being presented on the display 114. The content queue 106 comprises an example first page illustrated in FIG. 1 that presents a listing of user-specified media content events which the user is interested in accessing at some future time via their media device 102. In some situations, one or more of the indicated media content events of interest may not be currently accessible at the media device 102. In other instances, one or more of the indicated media content events of interest may be currently accessible by the media device 102 from one or more content sources. Thus, the content queue 106 informs the viewing user about the current availability of a particular media content event of interest that the user has previously added into their media content event queue data 104.

The presented first page of the content queue 106 provides various information that intuitively informs the user about each listed media content event. The information, in a non-limiting example embodiment, is presented using a column format. In the simplified illustrated content queue 106, a first indicated media content event of interest is shown at the top of the content queue 106. Near the bottom of the content queue 106 is an "$i^{th}$" indicated media content event of interest (understanding that, in practice, a plurality of other indicated media content events of interest are shown there between). In the event that the size of the display 114 is not sufficient to indicate all of the user-specified media content events, a scrolling system, paging system or the like may be used to present other indicated media content events of interest to the user that are not initially presented when the content queue 106 is initially opened by the user. Thus, the content queue 106 may have as few, or as many, user-specified media content events as the user is interested in accessing with their media device 102.

In the simplified hypothetical content queue 106 of FIG. 1, the information associated with an indicated media content event of interest includes textual information 144 and an optional graphical element 146. In an exemplary embodiment, the user navigates about the content queue 106 to "focus" on a particular one of the indicated media content events of interest (here, the focus on the first indicated media content event of interest is indicated using a bold font for the presented textual information 144 and a bolding outline of the optional graphical element 146). Thus, FIG. 1 hypothetically illustrates that the user has navigated to and focused on the first indicated media content event of interest. The other indicated media content events of interest, such as the last "$i^{th}$" indicated media content event of interest, has not been focused on by the user.

The term focus generally refers to a visual indication that is presented to the viewing user in response to their intended selection of an item that is listed on a graphical user interface, such as an EPG or the example content queue 106. The user is able to navigate about a presented EPG or the example content queue 106 by activating selected ones of the controllers 132 of their remote control 130. For example, a controller 132 associated with a down movement or downward direction arrow may move the current focus downward to the next lower item shown in a listing presented on the EPG or the example content queue 106. Focusing may be indicated in any suitable manner that informs the user of the current item that they have focused on. Further, the user appreciates that when a related operation is performed on the focused-to item using the EPG or the example content queue 106, the operation will be performed only on the focused to item and not on other non-focused listed items. In FIG. 1, the focused-to item is the first indicated media content event of interest.

The textual information 144 of a listed item on the content queue 106 provides various information of interest to the user. In an example embodiment, the textual information 144 indicates the title of the indicated media content event. Here, the title of the first indicated media content event is "Content A Title" (which is appreciated to represent any suitable title that the associated media content event has been named by its producers). Optionally, the textual information 144 indicates a date that the user added the media content event to the media content event queue data 104. Here, the date conceptually illustrated in the textual information 144 as the Request (REQ.) date xxxxx. Thus, the user is informed how long the indicated media content event has been on their watch list. Alternatively, or additionally, a duration that the media content event has been in the media content event queue data 104 may be indicated to the user.

The textual information 144 optionally indicates the number of content sources that the indicated media content event is currently accessible from using their media device 102. This novel feature informs the user about the number of access alternatives that they currently have for that particular indicated media content event. For example, the first indicated media content event indicates that the media content event is available from six different content providers (here, conceptually illustrated with the text "Content Sources: 6"). In contrast, the user understands that the "$i^{th}$" indicated media content event of interest is accessible from only one content provider (here, conceptually illustrated with the text "Content Sources: 1"). Since the content queue 106 is frequently updated, when the number of content providers that provide access to the indicated media content event changes, the user can be informed of the increasing (or decreasing) availability of the indicated media content event.

In some instances, the user may have specified a media content event that the media device 102 cannot yet access. In such situations, an indication such as "Content Sources: 0" or Content Sources: NONE" may be indicated to the user to inform the user that that particular indicated media content event is not yet accessible to the media device 102. Since the content queue 106 is frequently updated, when that indicated media content event finally becomes available and the availability is then indicated to the viewing user, the user can be informed of the new availability of the indicated media content event.

Any suitable information that is of interest to the user may be included in the textual information 144. Some embodiments may provide a brief description of the indicated media content event and/or indicate its genre (action movie, comedy, love story, etc.). Actors, production dates, scene locations may be optionally indicated in the textual information 144.

The optional graphical element 146 provides a visual indication to the viewing user about the identity of the associated indicated media content event. The optional graphical element 146 may be a still image and/or may be a relatively short video clip, such as from a part of the indicated media content event. Thus, the viewing user more quickly and readily is able to identify an indicated media content event by viewing its associated optional graphical element 146. Any suitable optional graphical element 146 may be used by the various embodiments. For example, the first indicated media content event is identified by a optional graphical element 146*a* showing a street scene with an actor. The "$i^{th}$" indicated media content event of interest is identified by a optional graphical element 146*i* showing a speaking actor. Presumably, the scene and/or the actors shown in the respective optional graphical elements 146*a* and 146*i* are well known, and thus, are readily identifiable by the viewing user so that the user more easily is able to identify the associated indicated media content event.

The example content queue 106 optionally comprises one or more active regions 148 (interchangeably referred to herein as a hot spot and/or a GUI button) that facilitate management of the indicated media content events shown in the content queue 106. Each active region 148, when navigated to and focused on by the user, is configured to perform a specific operation on a currently focused-to indicated media content event. The performed operation is indicated using text which intuitively informs the user of the specific operation. Various embodiments may include more, or may have fewer, of the non-limiting operations illustrated in the hypothetical content queue 106 of FIG. 1. Any suitable function or operation may be included on the content queue 106 depending upon the embodiment of the media content event quick access queue system 100. Further, a dedicated one of the controllers 132 on the remote control 130 may be assigned to perform the same operation as the associated hot spot.

A first example operation used to manage indicated media content events is a delete operation. The hot spot 148*a*, indicated by the text "DEL" within the focus box 148*a*, intuitively informs the user that their selection of this hot spot will cause the deletion of a currently focused-to one of the indicated media content events from the media content event queue data 104. Thus, after viewing a particular one of the indicated media content events, the user may remove this particular media content event from their watch list. In the simplified content queue 106 of FIG. 1, the user appreciates that activation of the delete operation will remove the first indicated media content event (indicated by the text 144*a* and the optional graphical element 146*a*) from their watch list.

A second example operation used to manage indicated media content events is a play operation. The hot spot 148*b*, indicated by the text "PLAY" within the focus box 148*b*, intuitively informs the user that their selection of this hot spot will cause the media device to access and then present the currently focused-to indicated media content event. Thus, after understanding that a particular one of the indicated media content events is available from a content provider as indicated by the textual information 144, the user may initiate immediate presentation of this particular media content event using a play operation.

In the simplified content queue 106 of FIG. 1, the user appreciates that activation of the play operation will initiate presentation of the currently focused-to first indicated media content event (indicated by the text 144*a* and the optional graphical element 146*a*). However, in this simplified example, since there are six available options for accessing the first indicated media content event (from six different content providers), the media content event quick access queue system 100 will present those options to the user so that the user can select a preferred access option from the six available access options. The currently available content access options are presented to the user in response to their selection of this play operation.

If the user navigates to and focuses on the "$i^{th}$" indicated media content event of interest which has only a single access option, the play operation will cause the media device 102 to access the "$i^{th}$" indicated media content event of interest from the one content source that the media device 102 currently has access to since there is only one content access option. However, in some embodiments, a confirmation pop-up pane or the like may be presented to the user in response to selection of the play operation to confirm the user's intent for immediate access and presentation of the "$i^{th}$" indicated media content event of interest. This confirmation feature may be significant if there is a cost that will otherwise be incurred by the user if the "$i^{th}$" indicated media content event of interest is accessed and is presented.

A third example operation used to manage indicated media content events is a search operation. The hot spot 148*c*, indicated by the text "SRCH" within the focus box 148*c*, intuitively informs the user that their selection of this hot spot will search operation of the indicated media content events. For example, the media content event queue data 104 may have many different media content events included in the user's watch list such that only a limited number of indicated media content events can be shown on a presented content queue 106. Here, the user may be interested in finding a particular one of the indicated media content events. The search operation permits the user to perform a search for a particular media content event of interest that has been previously added into their watch list. In response to this user selection, a pop-up pane, search window or the like is presented to the user. Any search process now known or later developed may be used by the various embodiments. For example, a title search, name search or the like may be used to identify one or more associated media content events that have been saved into the user's watch list. Searches may be based on other criteria, such as genre or the like.

The particular order in which the indicated media content events are shown in a presented content queue 106 may vary depending upon the embodiment and/or a user selection or preference. In an example embodiment, the indicated media content events are ordered by the selection date (either using earliest specified or latest specified). Alternatively, or additionally, the indicated media content events may be ordered alphabetically by their title. Genres may also be used for ordering the indicated media content events. Any suitable ordering system, or a combination of ordering systems, may be sued by the various embodiments. For example, the indicated media content events may be initially grouped by their genre (action movie, comedy, love story, etc.), and then ordered based on their title. For example, the user can quickly find all comedies that they have added into the media content event queue data 104.

A fourth example operation used to manage indicated media content events is a sort operation. The hot spot 148*d*, indicated by the text "SORT" within the focus box 148*d*, intuitively informs the user that their selection of this hot spot will cause a sorting change that modifies the order of the indicated media content events shown on the watch list. For example, the order of the indicated media content events may be based on the date that the user added each particular media content event of interest into their watch list. However, the user may wish to reorder the listing by the title of the media content events. Thus, the search operation permits the user to specify and/or change the listing order of the indicated media content events.

In an example embodiment, in response to a selection of the sort option, a pop-up pane or the like may be presented to the user which indicates a plurality of sort options. The user may then select a particular order option that is of interest.

A fifth example operation used to manage indicated media content events is a record operation. The hot spot 148*e*, indicated by the text "REC" within the focus box 148*e*, intuitively informs the user that their selection of this hot spot will cause the media device 102 to automatically record the selected one of the indicated media content events using the record operation. This operation may be desirable in the event that the user is informed or knows that the indicated media content event will be broadcast to the media device 102 at some future point in time. For example, the textual information 144 may optionally indicate that the indicated media content event will be available in a future broadcast, thus informing that they may opt to record the indicated media content event when it is broadcast. Here, the user does not have to configure their media device to perform the recording of the indicated media content event when it is eventually broadcast. However, in some embodiments, a confirmation pop-up pane or the like may be used to confirm the user's intent for a recording of the indicated media content event of interest. This feature may be significant if there is a cost that will otherwise be incurred by the user if the indicated media content event of interest is recorded.

Figure 2:
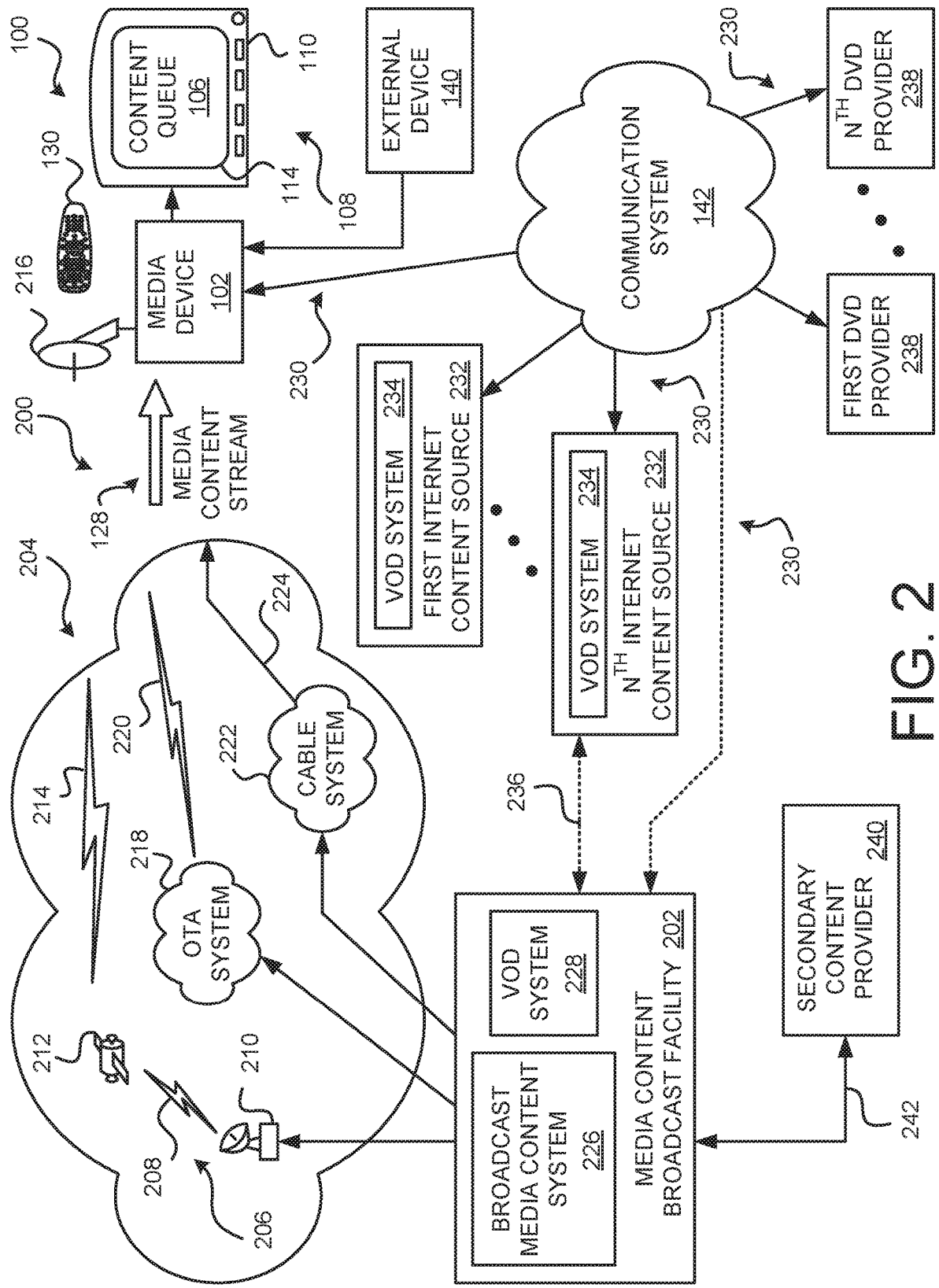
FIG. 2 is a block diagram of media content event access network in which an embodiment of a media content event quick access queue system obtains access to indicated media content events of interest shown on a presented content queue.

FIG. 2 is a block diagram of media content event access network 200 in which an embodiment of media content event quick access queue system 100 obtains access to indicated media content events of interest shown on a presented content queue 106. To facilitate disclosure of the operation of an exemplary embodiment of the media content event quick access queue system 100, access to and delivery of media content events to the media device 102 are briefly described. A broadcast content provider receives media content at its media content broadcast facility 202, in the form of a plurality of media content events, from a plurality of local program providers or other content providers. The provided media content events may include, but are not limited to, a television program, a newscast, a broadcast sports event, a movie, or the like. The media content is typically provided in the form of a video stream and a synchronized audio stream, herein referred to interchangeably as the media content stream 128.

The broadcast content provider processes the received media content streams as necessary to prepare them for transmission (interchangeably referred to herein as a "broadcast") to a plurality of media devices 102. For example, commercials or the like may be incorporated with a particular media content event. Alternatively, or additionally, the media content may be associated with identifiers, such as channel number and/or station call signs. The processed media content is aggregated and is broadcast over a broadcast system 204 that is received as a media content stream 128 at the media devices 102.

A variety of types of communication systems may be used for the broadcast system 204 to communicate the media content stream(s) 128 to the media devices 102. The broadcast system 204 may employ a satellite system 206 wherein an uplink signal 208 (with the media content streams 128 embedded therein) is communicated from a ground antenna 210 up to one or more satellites 212. Each of the exemplary satellites 212 broadcast a wireless satellite signal 214 (with the media content streams 128 embedded therein) down to a receiver antenna 216 that is coupled to the media device 102. The media device 102 receives the media content stream 128 from the receiver antenna 216.

Alternatively, or additionally, the broadcast system 204 may employ an over the air (OTA) system 218 wherein a wireless signal 220 (with the media content streams 128 embedded therein) is communicated using a wireless signal format that is received by the receiver antenna 216. The media device 102 then receives the media content stream 128 from the receiver antenna 216.

Alternatively, or additionally, the broadcast system 204 may employ a cable system 222 wherein a wire-based signal is communicated using a suitable cable 224 or the like that is communicatively coupled to the media device 102. Non-limiting examples of the cable 224 include a fiber optic cable, a coaxial cable, and telephone line. The media device 102 then receives the media content stream 128 via the cable 224.

Summarizing, the user's media device 102 may access media content events when they are broadcast out from the media content broadcast facility 202. Since EPG information identifies the broadcast schedule for the broadcasting of the media content events, embodiments of the media content event quick access queue system 100 can compare the user-specified media content events of the media content event queue data 104 with the EPG information to identify scheduled broadcast times of the user-specified media content events that are in the media content event queue data 104. As this broadcast schedule information becomes available, the information in the media content event queue data 104 for a broadcasting media content event can be updated and then indicated on the content queue 106 when presented to the user.

Also, various operations and or information modifications can be performed on the information in the media content event queue data 104 based on changes in the EPG information. For example, if a particular user-specified media content event is being broadcast for the first time, the media device 102 may automatically record the user-specified media content event as it is being broadcast. Alternatively, or additionally, the broadcast information and/or schedule may be included in an updated content queue 106.

The broadcast content provider broadcasts many different media content events to the plurality of receiving media devices 102. The media content broadcast facility 202 conceptually illustrates a broadcast media content system 226 that generically represents the components of the media content broadcast facility 202 that are used to broadcast the media content events. One skilled in the arts appreciates that the broadcast media content system 226 is a very complex and complicated system, and is therefore, not described in detail for brevity.

In some situations, a broadcast content provider may also operate a video on demand (VOD) system 228 that provides a particular media content event to a particular media device in response to a user request for that particular media content event. The VOD system 228 has a memory medium in which a plurality of media content events are stored. Here, a user makes requests to view a particular media content event, and their media device 102 generates and communicates the request to the VOD system 228. Based on a request received from a media device 102 for a particular media content event, the VOD system 228 accesses and communicates the requested media content event to the media device, typically as a stream of media content. The request identifies both the requested media content event and the requesting media device 102. In response to receiving the request, the VOD system 228 determines if the requesting media device 102 is authorized to access the requested media content event. If access is authorized, then the VOD system 228 then communicates the requested media content event to the media device 102 (preferably as a stream of media content with the media content streams 128 embedded therein). Typically, the media device 102 then presents the received media content event to the user. Alternatively, or additionally, the media content event may be recorded by the media device 102.

In this situation where the media device 102 is authorized to access the requested media content event, the media device 102 has information that is used to indicate to the user that they are currently authorized to access the requested media content event. If the accessible media content event is included as a member of the user-specified media content events of the media content event queue data 104, then embodiments of the media content event quick access queue system 100 are configured to analyze and recognize this information pertaining to the above-described accessible media content events that the user is currently authorized to access. Accordingly, when a content queue 106 is presented to the user, the current accessibility of the user-specified media content event included in the user's watch list can be incorporated into the information that is presented to the user.

In some instances, the media device 102 is not currently authorized to have access to the requested media content event. In such situations, the VOD system 228 may then deny access of that media content event to the requesting media device 102. That is, the media content event is not communicated to the requesting media device 102.

However, the user may have the opportunity to conditionally access the requested media content event from the VOD system 228 if the user meets certain conditions. For example, access requirements may dictate that the media content event may be available on a pay-per-view basis, wherein access to the requested media content event is granted upon an agreement of the user to pay for, or for actual payment of, the conditional access. In response to the user's payment or their agreement to pay, the VOD system 228 may then grant access to the requested media content event. That is, the requested media content event is communicated to the requesting media device 102 after payment.

In such conditional access situations where the media device 102 is not currently authorized to access a particular media content event, the media device 102 has information that is used to indicate to the user that they are not currently authorized to access the requested media content event. Further, the information includes the access requirements (here, that access may be available upon their agreement to pay or upon payment for access to the requested media content event). If the requested media content event is included as a member of the user-specified media content events of the user's watch list (that is, in included in the media content event queue data 104), then embodiments of the media content event quick access queue system 100 are configured to analyze and recognize this information pertaining to the above-described conditional access conditions. Accordingly, when a content queue 106 is presented to the user, the conditional access and the access requirements associated with the user-specified media content events of the media content event queue data 104 can be incorporated into the information that is presented to the user.

One skilled in the art appreciates that the VOD system 228 operated by the broadcast content provider is compatible with the subscriber media devices 102 that receive the broadcast indicated media content events. That is, the media devices 102 are configured to communicate with the broadcast content provider's VOD system 228. In practice, if the satellite system 206 or the OTA system 218 is used to broadcast media content events, then the media device 102 establishes a communication link 230 to the broadcast content provider's VOD system 228. The communication link 230, interchangeably referred to as a backchannel in the arts, is established between the media device 102 and the VOD system 228 through the communication system 142.

The communication system 142 is illustrated as a generic communication system. In one embodiment, the communication system 142 comprises a cellular telephone system, such as a radio frequency (RF) wireless system. Accordingly, the media device 102 includes a suitable transceiver. Alternatively, the communication system 142 may be a telephony system, the Internet, a Wi-Fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment. If a cable system 222 is employed, the cable 224 may provide the physical connection for the communication link 230.

In practice, when a user of the media device 102 is interested in obtaining a particular media content event from the broadcast content provider's VOD system 228, a request for presentation of a VOD graphical user interface (GUI), not shown, that indicates available VOD accessible media content events from the VOD system 228 and the associated access conditions, if any. The request may be initiated by the user via their remote control 130. In response to the user request, the VOD GUI is presented to the user. The VOD GUI may present graphical elements and/or textual information. The user may navigate about the VOD GUI to focus on and then select a particular VOD accessible media content event of interest that the user wishes to access. Typically, many different VOD accessible media content events are available from the broadcast content provider's VOD system 228. Thus, multiple pages are required for all available VOD accessible media content events to be indicated to the user on a presented VOD GUI. Further, a layering system or categorization system may be used to facilitate the indication of available VOD accessible media content events.

In this VOD access situation, the media device 102 has received information from the broadcast content provider that is used to generate and present the VOD GUI. If one or more of the VOD accessible media content events are included as members of the user-specified media content events of the user's watch list, then embodiments of the media content event quick access queue system 100 are configured to analyze and recognize this information pertaining to the above-described VOD accessible media content events. Accordingly, when a content queue 106 is presented to the user, the VOD accessible media content event information associated with the user-specified media content events of the user's watch list can be incorporated into the information that is presented to the user.

FIG. 2 further illustrates a plurality of Internet content sources 232 that provide access to a plurality of VOD accessible media content events. Each of these Internet content sources 232 are owned and operated be a VOD content provider. Each Internet content source 232 includes a proprietary VOD system 234. In some situations, access to the proprietary VOD system 234 is limited to subscribers who have paid a subscription fee or the like to the VOD content provider. Alternatively, or additionally, access to a particular available VOD accessible media content event may be provided on a payment basis (such as a pay-per-view basis and/or a limited rental basis).

In practice, a media device 102 operates a browser type program to establish a communication link 230 to a particular Internet content source 232 of interest. The media device 102 then accesses a proprietary VOD GUI that is used to indicate VOD accessible media content events that are available from that particular Internet content source 232. In response to a user selection for a particular media content event, assuming that the access conditions are satisfied, the media content event is communicated to the media device 102 (in a media content stream 128).

One skilled in the art appreciates that each proprietary VOD GUI of the plurality of Internet content sources 232 is unique. However, the browser operated by the media device 102 is configured to be compatible with each unique proprietary VOD GUI. Accordingly, the media device 102 is able to establish a communication link 230 to any particular Internet content source 232 of interest, receive information that is used to generate and present their proprietary VOD GUI, and then initiate a request for a particular media content event of interest via the presented proprietary VOD GUI.

In this VOD access situation where VOD accessible media content events are indicated using a proprietary VOD GUI, the media device 102 has access to information that is used to generate and present the proprietary VOD GUI. If one or more of the VOD accessible media content events available from a particular internet content source 232 are included as members of the user's watch list, then embodiments of the media content event quick access queue system 100 are configured to analyze and recognize this information pertaining to the above-described VOD accessible media content events. Accordingly, when a content queue 106 is presented to the user, the VOD accessible media content event information associated with the user-specified media content events of the user's watch list can be incorporated into the information that is presented to the user.

In practice, prior to presentation of a content queue 106 to the user, and/or in response to a request for presentation of the content queue 106, embodiments of the media content event quick access queue system 100 are configured to access each of the plurality of Internet content sources 232 and obtain information pertaining to their VOD accessible media content events. That is, the media content event quick access queue system 100 operates the browser of media device 102 to establish the communication link 230, downloads or otherwise obtains the information used to generate and present the proprietary VOD GUI of that particular Internet content source 232, and then further processes this information for incorporation into the media content event queue data 104 for those particular media content events of the user's watch list.

In some situations, the broadcast content provider acts as an intermediary agent with one or more of the VOD content providers that own and operate a proprietary VOD system 234. That is, the media device 102 is configured to indirectly access the VOD content provider's proprietary VOD system 234 via the broadcast provider's system.

In such situations, the media content broadcast facility 202 and the Internet content source 232 may be communicatively coupled together via a communication link 236. The broadcast provider can then receive information that corresponds to the VOD accessible media content events available from that particular VOD content provider. The broadcast content provider can then reformat the information into a non-proprietary VOD GUI that can be utilized by the media devices 102.

In some situations, the access conditions for the media content events available from the proprietary VOD system 234 via the broadcast provider may be different from the access conditions availed to the media device 102 if otherwise directly connected to the Internet content source 232 using the browser of the media device 102. In some situations, access prices for a particular media content event available from the proprietary VOD system 234 may be different for subscribers of the broadcast provider. For example, a particular media content event may be accessible for free via the broadcast provider (in view of a premium subscription service purchased by the user) and may be available for a fee if accessed directly from the proprietary VOD system 234 of the Internet content source 232 using the browser of the media device 102.

In this VOD access situation where VOD accessible media content events are available from both the broadcast provider and one or more Internet VOD content providers, the media device 102 has access to information that is used to generate and present the non-proprietary VOD GUI provided by the broadcast provider and the proprietary VOD GUI of the Internet content source 232. If one or more of the VOD accessible media content events available from the broadcast content provider (via a particular internet content source 232) are included in the user's watch list, then embodiments of the media content event quick access queue system 100 are configured to analyze and recognize this information pertaining to the above-described VOD accessible media content events. Accordingly, when a content queue 106 is presented to the user, the broadcast content provider VOD accessible media content event information associated with the user's watch list can be further incorporated into the information that is presented to the user for the indicated media content events available via the broadcast content provider and via the particular VOD content provider. Thus, the user is able to select a preferred access either through the broadcast content provider or directly from the particular Internet VOD content provider(s).

FIG. 2 further illustrates a plurality of physical memory medium content providers (interchangeably referred to herein as a DVD provider 238) that provide physical access to a plurality of media content events that have been stored in a physical memory medium. Media content events may be provided on any suitable physical memory medium. With this content access process, the user takes physical possession of the memory medium that stores a particular media content event that the user in interested in viewing. Typically, the user "rents" the physical memory medium for some duration for a fee. In some situations, the memory medium, such as a DVD or the like, may be available at a retail outlet, such as a retailer, a movie store or a kiosk. Alternatively, the physical memory medium may be available from the physical memory medium content provider via a mail or postal service.

Each of these DVD providers 238 are owned and operated by a suitable physical memory medium content provider. Often a DVD provider 238 may utilize an information system that includes a proprietary GUI system that can be accessed by the user, via the media device 102 or another electronic device, so that the user is informed of which particular media content events are available from the physical memory medium content provider. The GUI system is often operated on a real-time basis, or near real time basis, such that the user can reliably choose to go to the physical location to obtain the physical memory medium if available at an outlet, store, kiosk or the like. Alternatively, or additionally, the user may order a mail delivery of the physical memory medium to their residence or other designated delivery address. Prices and/or durations for renting the physical memory medium are also typically indicated by the GUI system. Further, in some situations, the DVD may not yet be available, but its future date of availability will be indicated on the GUI. In some situations, access to the DVD providers 238 is limited to subscribers who have paid a subscription fee or the like.

Using the browser of the media device 102, the user is able to access the information that is used to generate and present the GUI system of the physical memory medium content provider. Here, the media device 102 established a communication link 230 to a DVD provider 238 of interest, and then views the GUI that indicates the particular media content events that are available on a physical memory medium from that particular physical memory medium content provider.

One skilled in the art appreciates that a broadcast content provider operating the media content broadcast facility 202 typically provides a plurality of premium subscription content services from a plurality of other secondary content providers 240, wherein a monthly service fee is assessed monthly by the broadcast content provider. Typically, these secondary content providers 240 are directly and communicatively coupled to the media content broadcast facility 202 via a communication link 242. The example secondary content provider 240 may optionally have a VOD system. In some instances, the user may currently be a subscriber to the content service provided by the media content broadcast facility 202 secondary content provider 240. The broadcast content provider includes the VOD assets provided y the secondary content provider 240 using the VOD GUI provided to the media devices 102 by the broadcast content provider (along with other media content event assets provided by the broadcast content provider).

In practice, prior to presentation of a content queue 106 to the user, and/or in response to a request for presentation of the content queue 106, embodiments of the media content event quick access queue system 100 are configured to access each of the plurality of DVD providers 238 and obtain information pertaining to their available media content events. That is, the media content event quick access queue system 100 operates the browser of media device 102 to establish the communication link 230 to the Internet content source 232, downloads or otherwise obtains the information used to generate and present the GUI of that particular physical memory medium content provider, and then processes this information for incorporation into the media content event queue data 104.

Summarizing the process that is used to update the information in the media content event queue data 104 which is used to generate and present a content queue 106 to the user, a first example step is that the media content event quick access queue system 100 "harvests" current access information from a plurality of different content providers. Here, harvesting is defined as the process hereby the content access information is retrieved and processed by the media device 102 so that access information for the plurality of user-specified media content events is updated and is current. Accordingly, when the user is presented the content queue 106, current access information for each media content event of the user's watch list for all different content providers is updated and is stored in the media content event queue data 104. The user may then optionally select a content provider that provides an indicated media content event listed in their watch list based on their personal preferences.

In some situations, a content provider may have previously provided access to one of the user-selected media content events identified in the user's watch list, but as discovered during the updating process, the content provider currently does not currently provide access to this particular media content event. For example, the content provider may have discontinued this particular media content event from their list of content assets. Accordingly, during the harvesting process, information corresponding to that content provider for that particular one of the identified media content events that is no longer currently available is deleted from the media content event queue data.

The harvesting process (interchangeably referred to herein as an updating process) may be conducted periodically. Alternatively, or additionally, the harvesting process may be performed in response to a user request for presentation of the content queue 106. Alternatively, or additionally, the harvesting process may be performed at times when the user is not currently using their media device 102 for content presentation. Alternatively, or additionally, the harvesting process may be performed at predefined times of the day. Alternatively, or additionally, the harvesting process may be performed in response to a request or command issued by the broadcast content provider or another party, such as when a particular content provider updates their information systems. Such harvesting processes may be initiated at any suitable time and/or during any suitable operating condition at the media device 102.

With respect to FIG. 2, a hypothetical harvesting process is now described. Here, the media device 102 establishes a communication link 230 to the VOD system 228 operated by the broadcast content provider, to each of the VOD systems 234 operated by the Internet content sources 232, and to each of the DVD providers 238. Preferably, the communication links 230 are established using the browser of the media device 102, though any communication link establishment process or system may be used.

Then, the media device 102 accesses and retrieves the information that identifies the particular media content events of the user's watch list that are available from each of the content providers or sources. Preferably, this information is accessed and retrieved using the browser of the media device 102.

Information identifying each of the available media content events for each particular content provider or source are compared with the media content events of the user's watch list. When one of the available media content events corresponding to one of the user-specified media content events of the user's watch list is identified, then the information indicating the availability of the media content event is stored into the media content event queue data 104. That is, information identifying the content provider or source is saved.

Access condition information for each of the available user-specified media content events of the user's watch list is also accessed by the media device 102. For example, cost information and/or availability date information is accessed and retrieved by the media device 102, preferably using the browser of the media device 102. The retrieved access condition information is associated with that particular content provider or source and is then saved into the media content event queue data 104.

Accordingly, at the conclusion of a harvesting process, the media content event queue data 104 has updates information that identifies possible content providers or sources of the user-specified media content events listed in the user's watch list. Further, access conditions (costs, availability dates, etc.) are also included in the media content event queue data 104.

In the various embodiments, each content provider or source may be serially accessed during the harvesting process. Alternatively, one or more of the content providers or sources may be concurrently accessed during the harvesting process. Further, one or more individually selected content providers or sources may be included in a harvest process while other content providers or sources are omitted.

Additionally, the harvest process may include a search of the current EPG information that has been provided to the media device 102 by the broadcast content provider. When a scheduled broadcast of one of the user-specified media content events in the user's watch list is identified in the EPG information, the scheduled broadcast times and channel information are optionally saved into the media content event queue data 104.

Figure 3:
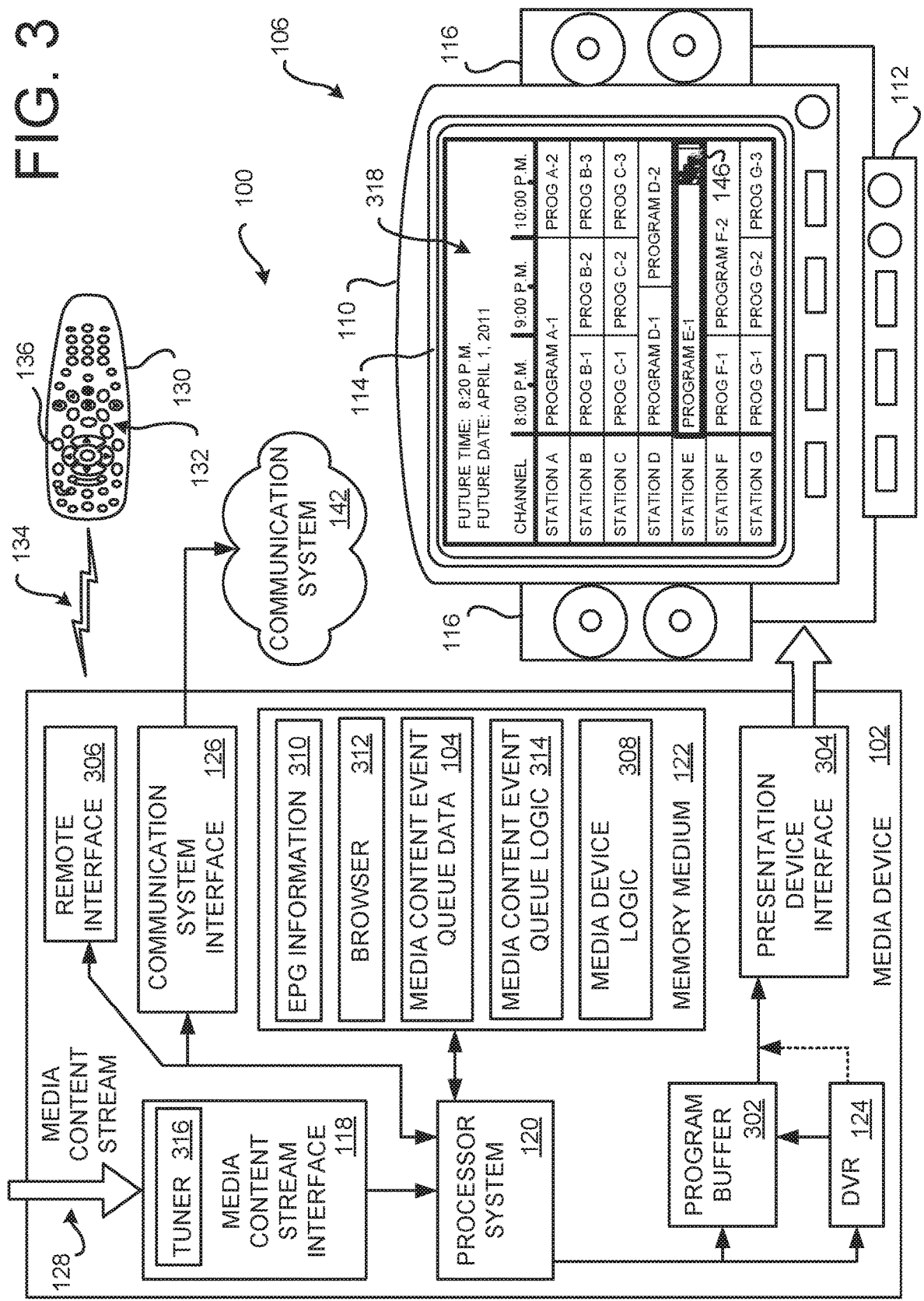
FIG. 3 is a block diagram of showing greater detail of selected components of a media device provisioned with an embodiment of the media content event quick access queue system.

FIG. 3 is a block diagram of showing greater detail of selected components of a media device 102 provisioned with an embodiment of the media content event quick access queue system 100. As discussed above, the exemplary media device 102 is communicatively coupled to a media presentation system 106.

The non-limiting exemplary media device 102 comprises a media content stream interface 118, a processor system 120, a memory medium 122, a program buffer 302, an optional digital video recorder (DVR) 124, a presentation device interface 304, a remote interface 306, and the communication system interface 126. The memory medium 122 comprises portions for storing the media device logic 308, the electronic program guide (EPG) information 310, a browser 312, media content event queue logic 314 and the media content event queue data 104. In some embodiments, media device logic 308, the browser 312, and the media content event queue logic 314 may be integrated together, and/or may be integrated with other logic. In other embodiments, some or all of these memory and other data manipulation functions may be provided by using a remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. In a satellite broadcast system, a broadcast content provider provides media content that is received in one or more multiple media content streams 128 multiplexed together in one or more transport channels. The transport channels with the media content streams 128 are communicated to the media device 102 from a media system sourced from a media content broadcast facility 202 (FIG. 2) operated by the broadcast content provider. The media device 102 is configured to receive one or more broadcasted satellite signals detected by the receiver antenna 216. Non-limiting examples of other media systems that broadcast a media content stream 128 include a cable system 222, a radio frequency (RF) communication system such as the exemplary OTA system 218, and the Internet.

The one or more media content streams 128 are received by the media content stream interface 118. One or more tuners 316 in the media content stream interface 118 selectively tune to one of the media content streams 128 in accordance with instructions received from the processor system 120. The processor system 120, executing the media device logic 308 and based upon a request for a media content event of interest specified by a user, parses out media content associated with the media content event of interest. The media content event of interest is then assembled into a stream of video and/or audio information which may be stored by the program buffer 302 such that the media content can be streamed out to components of the media presentation system 108. Alternatively, or additionally, the parsed-out media content may be saved into the DVR 124 for later presentation. The DVR 124 may be directly provided in, locally connected to, or remotely connected to, the media device 102. In alternative embodiments, the media content streams 128 may be stored for later decompression, processing and/or decryption.

In this simplified embodiment, the presentation device interface 304 is illustrated as coupled to the media presentation system 108 that includes the visual display device 110 and the audio presentation device 112. Other types of output devices may also be coupled to the media device 102, including those providing any sort of stimuli sensible by a human being, such as temperature, vibration and the like. The video portion of the streamed media content is displayed on the display 114 and the audio portion of the streamed media content is reproduced as sounds by the speakers 116.

From time to time, information populating the EPG information 310 portion of the memory medium 122 is communicated to the media device 102, via the media content stream 128 or via another suitable media. The EPG information 310 stores the information pertaining to the scheduled programming of broadcasting indicated media content events. The information may include, but is not limited to, a scheduled presentation start and/or end time, a channel that the media content event is associated with, and descriptive information for each media content event. The media content event's descriptive information may include the title of the media content event, names of performers or actors, date of creation, and a summary describing the nature of the media content event. Any suitable information may be included in the media content event's supplemental information. Upon receipt of a command from the user requesting presentation of an EPG display, the information in the EPG information 310 is retrieved, formatted, and is then presented on the display 114 as an EPG 318.

The processes performed by the media device 102 relating to the processing of the received media content stream 128 and communication of a presentable media content event to the components of the media presentation system 108 are generally implemented by the processor system 120 while executing the media device logic 308. Thus, the media device 102 may perform a variety of functions related to the processing and presentation of one or more media content events received in the media content stream 128.

The processes performed by the media device 102 relating to the processing of the information pertaining to the user-specified media content events included in the media content event queue data 104 are generally implemented by the processor system 120 while executing the media content event queue logic 314. Here, the media content event queue logic 314 may manage operation of the browser 312 during a harvesting process.

FIG. 3 conceptually illustrates an example EPG 318 that indicates a plurality of channels that are scheduled to broadcast different media content events. The example EPG 318 is presented on a display 114 to assist a user to select a particular media content event or channel of interest. The EPG 318 is a type of a graphical user interface that presents a menu, or a series of menus, with a combination of text, graphical elements and/or symbols to represent viewing or recording choices for broadcasting media content events that may be selected by the user.

In the example EPG 318, programming channels are identified by a suitable identifier, such as the name of the programming station or the like. Here, the seven channels are identified as stations A-G. The media device 102 is configured to present programming that is provided by many different programming channels, sometimes even several hundreds of different programming channels. Accordingly, the user is able to navigate about the current EPG 318 so as to be able to access broadcasting media content events that are provided on one or more channels of interest.

Typically, the EPG 318 has the look and feel of a table with program information describing available media content events and/or channels that are currently being broadcast to the media device 102 in the available indicated channels. The information shown on the EPG 318 may include the title of available media content events, along with the scheduled time and date of the media content event presentation. A brief description of the media content events may also be provided on the EPG 318. The EPG 318 typically indicates the "channel" of the available media content event. The channel identifies the originating source of the program, such as a television studio, a premium movie provider, a national program provider, etc. Also, the EPG 318 may present an optional graphical element 146 for one or more indicated media content events.

Individual media content events that are currently available are shown adjacent to the programming channel on which they are available. For example, a media content event with the title "Program A1" is currently available on the programming channel identified as "Station A" (and so on). Thus, the user is able to appreciate which media content events are currently available, or are available in the future, for viewing. Further, the user may advance the broadcast time shown in the EGP 318 to future dates and times of interest.

The EPG 318 is interactive with the user. The user, via their remote control 130 that is in communication with a media device 102 is able to "scroll" or "navigate" about the EPG 318 to select a media content event of interest and/or to select a particular channel of interest (thereby being presented the media content that is being currently broadcast on that selected channel). When the user focuses on a portion of the EPG 318 corresponding to a particular media content event of interest and/or a particular channel of interest, the user may actuate one or more controllers 132 of the remote control 130 to cause the media device 102 to perform a function relative to the selected media content event or channel of interest.

For example, if particular media content event of interest is scheduled to begin, or is currently available, the user may select the media content event of interest for immediate presentation on the display 114 by navigating to the region of the EPG 318 that indicates that particular media content event. One of the controllers 132 on the remote control 130 is then actuated by the user to select that particular media content event.

In response to the user selection, the tuner 316 tunes itself to receive the media content stream 128 having the channel associated with the selected media content event. The received media content in the tuned-to channel is then processed and stored into the program buffer 302. The buffered media content event is then streamed out from the program buffer 302 to the components of the media presentation system 108 in a continuous and uninterrupted manner. Alternatively, or additionally, the user may have the media device record and store the media content in a memory, such as the example DVR 124, such that the user may later view the selected media content event at a more convenient time.

In the various embodiments of the media content event quick access queue system 100, the user may select a media content event of interest for addition to their user's watch list. Thus, based on the particular media content event indicated on the EPG 318, that media content event may be added to the user's watch list by adding the identifying information of that media content event into the media content event queue data 104. When the content queue 106 is presented to the user, this particular user-specified media content event will be included in the content queue 106 as one of the indicated media content events of the user's watch list.

For example, a particular media content event may be currently broadcasting. Here, the initial portion of the media content event (that has already been broadcast) cannot be viewed. Accordingly, the user may specify this particular media content event is to be added into their watch list. When the content queue 106 is presented, access options for this particular media content event will then be indicated to the user. Thus, if the media content event is to be later re-broadcast, the scheduled broadcast date and time can be indicated. If the media content event is available from one or more VOD content providers, the user may access the media content event from one of those content sources.

As another example, a particular media content event of interest may be scheduled for broadcasting at a future date and time. Further, the user may not favor the anticipated broadcast format (which may have been modified by the broadcast content provider) and/or may not wish to watch the commercials that have been interleaved into the media content event. Accordingly, the user may wish to learn about alternative access options that may be available for presentation of that particular media content event. Accordingly, the user may add this particular media content event into their watch list. When the content queue 106 is presented, access options for this particular media content event will then be indicated to the user.

In some embodiments, a special dedicated controller 136 on the remote control 130 may be configured to add a focused-to media content event shown on the EPG 318 to the user's watch list (by adding the identifying information of the media content event into the media content event queue data 104). Thus, a single actuation of the controller 136 by the user will add the focused-to media content event to their watch list.

When a particular media content event is selected by the user for inclusion into their watch list using the EPG 318, the media content event quick access queue system 100 may store selected EPG information into the media content event queue data 104. For example, the title of the user-specified media content event may be saved. Other identifying information that may be used by other content providers or sources may be saved. Descriptive information summarizing the user-specified media content event and/or genre information may be saved into the media content event queue data 104. If a graphical element is used in the presentation of the EPG 318, the EPG graphical element may be optionally saved as the graphical element 146*a*. Accordingly, the media content event quick access queue system 100 provides a convenient process by which the user may select a new media content event for inclusion in their watch list.

One skilled in the art appreciates that proprietary VOD GUIs from VOD providers and/or that GUIs from physical memory medium content providers may indicate available media content events to the user. Embodiments of the media content event quick access queue system 100 are further configured to permit the user to focus on an available media content event, and then select that media content event for addition into their watch list. For example, the user may be viewing a VOD GUI provided by the first internet content source 232. After the user has focused to one of the media content events available from that first internet content source 232, the user may similarly actuate the controller 136 to cause addition of that particular media content event into their watch list. When the content queue 106 is presented to the user at a later time, and after a harvesting process has been completed, the presented content queue 106 will indicate that the media device 102 may access that particular media content event from the first internet content source 232, and also indicate other content providers or sources that also provide access to the same media content event (along with their respective access conditions). Any suitable information available from the VOD GUI may be added into the media content event queue data 104, such as the title, supplemental information, and/or a graphical element.

Figure 4:
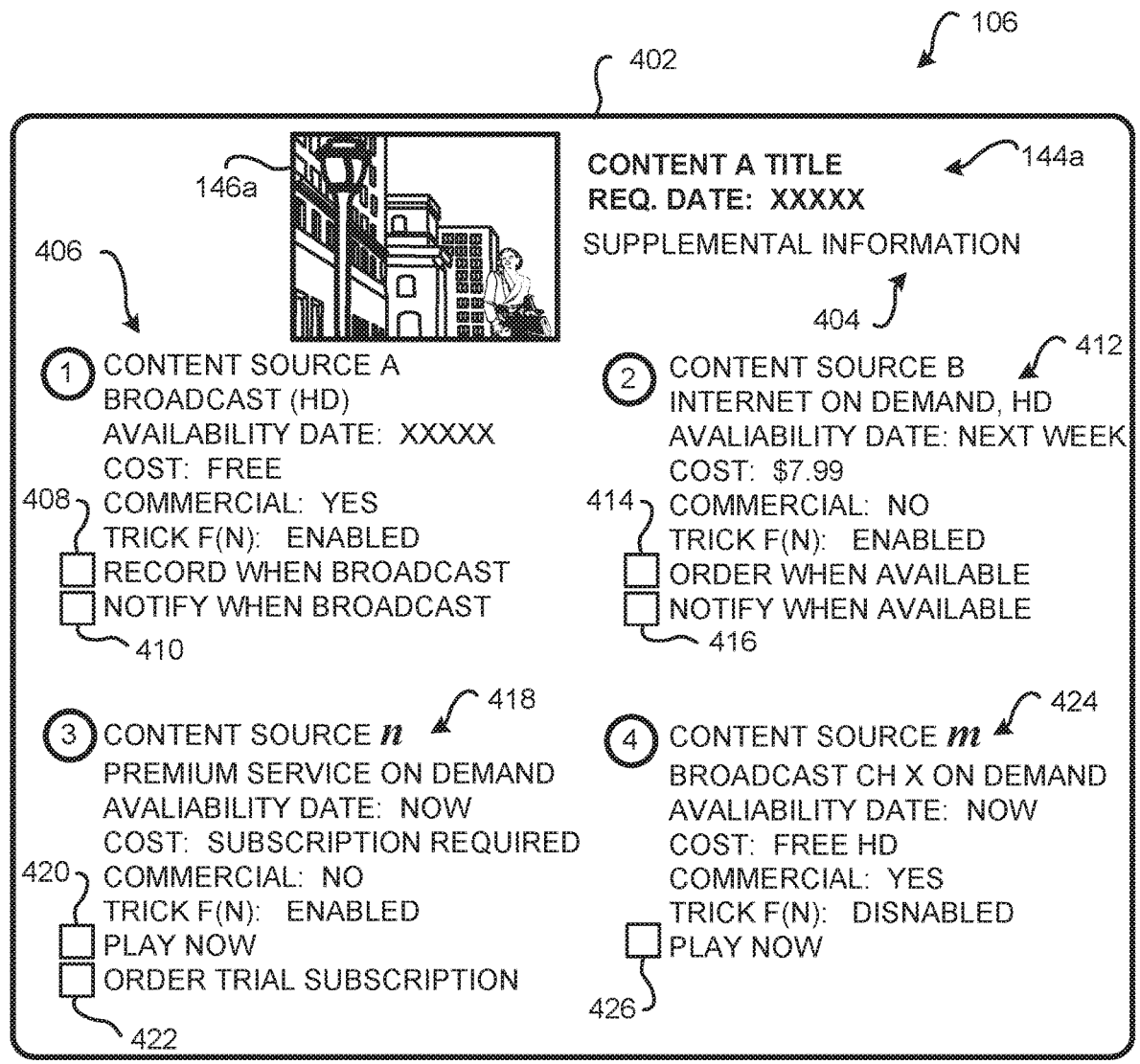
FIG. 4 is a second page of an example content queue that shows a greater detail of information about a particular user-specified media content event that is included in the user's watch list.

FIG. 4 is a second page 402 of an example content queue 106 that shows a greater detail of information about a particular user-specified media content event that is included in the user's watch list. The second page 402 of the content queue 106 corresponds to presentation of the content queue 106 that is made in response to selection of a focused-to indicated media content event shown on the first page of the content queue 106. Returning briefly to FIG. 1, the first indicated media content event (indicated by the text 144*a* and the optional graphical element 146*a*) is illustrated as being hypothetically focused to by the user. In response to a new user selection made via the remote control 130, embodiments of the media content event quick access queue system 100 are configured to next present additional information that identifies the various content providers or sources that provide access to the focused-to indicated media content event. Also, supplemental information describing the content providers or sources, describing attributes of the accessible media content event from that particular content provider or source, and access conditions are indicated on the second page 402 of the content queue 106.

In the simplified hypothetical second page 402 of the content queue 106 illustrated in FIG. 4, information about four of the six content providers or sources that can provide access to the first indicated media content event are shown on this example second page 402. It is appreciated that a paging function, scrolling function or the like may be used to later show information about the two remaining content providers or sources (noting that the first page of the content queue 106 shown in FIG. 1 indicates that the first indicated media content event was available from six content providers or sources).

In an example embodiment, the second page 402 of the content queue 106 indicates the text 144*a* and the optional graphical element 146*a* of the first indicated media content event. Additional supplemental information 404 stored in the media content event queue data 104 may also be indicated. Any suitable supplemental information may be shown. For example, but not limited to, information identifying actors, set location information, film and/or production dates, producer information or the like may be included in the supplemental information 404.

The second page 402 of the content queue 106 presents content attribute information 406 that indicates that a first content source (conceptually illustrated as "Content Source A") currently provides access to the first indicated media content event. Here, the user appreciates that this first access option is from a broadcasting program station that is broadcasting on a particular channel of the received broadcasting media content streams 128. The name of the broadcasting content source may be described (and optionally other information, such as a channel identifier). Further, the content attribute information 406 indicates that the format of the first indicated media content event is in high definition (HD), that it can be accessed free of any cost, and that trick functions (such as fast forward, rewind, etc.) are enabled. Also, the content attribute information 406 indicates that commercials will be interspersed through the broadcasting of the first indicated media content event. Additionally, the content attribute information 406 indicates the scheduled future broadcast date and time that the first content provider will be broadcasting this first indicated media content event to the media device 102.

In the various embodiments, the presented information describing a content provider or source may optionally include one or more active hot spots that facilitate access to the indicated media content event. An active hot spot (interchangeably referred to herein as an "active region") is a predefined geographic location in a presented GUI that, if selected by the user, will perform a predefined function. Typically, the region of the active hot spot is bounded by an outline or other identifiable region and has descriptive text adjacent to and in proximity to the region of the active hot spot to intuitively inform the user of the predefined operation that will be performed in response to the user's selection of that active hot spot. The user will navigate to a particular active hot spot of interest, which may optionally be indicated using a focus indicator or the like, and then select the active hot spot using their remote control 130 or another suitable pointing device or touch sensitive display.

For example, in view that the first content provider will be broadcasting the first indicated media content event for free during the indicated scheduled broadcast date and time, the user may wish to record and/or view this first indicated media content event when it is broadcast by the first content provider. The content attribute information 406 includes a first hot spot or active region 408 that permits the user to record the broadcasting first indicated media content event. If the user focuses to and selects this active region 408, the media device 102 is then configured to automatically record the first indicated media content event into the DVR 124 when it is broadcast at the scheduled future date and time.

Alternatively, or additionally, an active region 410 is provided that permits the user to request a notification that reminds the use of the broadcast of the first indicated media content event. Accordingly, when the scheduled broadcast date and time arrives, or in advance by some duration, the media device 102 may issue a notice that is presented to the user. Here, the user may then choose to manually record the broadcast of the first indicated media content event and/or change the tuning of the media device 102 to receive and present the first indicated media content event as it is being broadcast.

The second page 402 of the content queue 106 further presents content attribute information 412 that indicates that a second content source ("Content Source B") is scheduled to provide VOD access to the first indicated media content event at a future date ("next week"). Here, the user appreciates that this second access option is from a first VOD provider. The name of the first VOD provider may be described (and optionally other information, such as a channel identifier associated with this first VOD provider). Further, the content attribute information 412 indicates that first indicated media content event will be accessed via the Internet (see Communication System 142), indicates that the format of the first indicated media content event is in high definition (HD), that it can be accessed at a cost of $7.99, and indicates that trick functions (such as fast forward, rewind, etc.) are enabled. Also, the content attribute information 412 indicates that no commercials will be shown during presentation of the first indicated media content event.

A first active region 414 is provided so that the user may order the first indicated media content event from the first VOD provider when the media content event becomes available from that particular VOD provider. One skilled in the art appreciates that the absence of commercials may be a desirable user preference and may even be desirable enough to offset the access cost charged by this first VOD provider. Because of the cost to access the first indicated media content event, a confirming pop-up pane or the like may be used to confirm that the user is willing to pay or to be billed for the indicated access cost.

Alternatively, or additionally, a second active region 416 is provided that permits the user to request a notification that reminds the user that the first indicated media content event is now available from the first VOD provider. Accordingly, when the first indicated media content event becomes available, or in advance by some duration, the media device 102 may issue a notice that is presented to the user. Here, the user may then choose to pay the indicated access cost to receive the first indicated media content from the first VOD provider. Alternatively, since the media content event queue data 104 will have been updated at that time, the user may choose a different access alternative that is indicated on a newly presented and updated second page 402 of the content queue 106.

The second page 402 of the content queue 106 further presents content attribute information 418 that indicates that a third content source ("Content Source n") currently provides VOD access to the first indicated media content event on a subscription basis. Here, the user appreciates that this third access option is from a second VOD provider that provides the media content event to their subscribers. The name of the second VOD provider may be described (and optionally other information, such as a channel identifier associated with this second VOD provider). Further, the content attribute information 418 indicates that first indicated media content event will be accessed via the broadcast content provider's system, indicates that the format of the first indicated media content event is in high definition (HD), that it can be accessed at for free as part of a subscription, and indicates that trick functions (such as fast forward, rewind, etc.) are enabled. Also, the content attribute information 418 indicates that no commercials will be shown during presentation of the first indicated media content event.

One skilled in the art appreciates that a broadcast content provider typically provides a plurality of premium subscription content services from a plurality of other content providers, wherein a monthly service fee is assessed monthly by the broadcast content provider. Typically, these secondary content providers 242 (FIG. 2) have a VOD system. In some instances, where instances when the user is currently a subscriber to the content service provided by the second VOD provider, a first active region 420 may be provided for selection by the user. Here, selection of the active region 420 will cause the user's media device 102 to immediately access the media content event for presentation from the VOD system of the secondary content providers 240.

Alternatively, in some instances, the user is not a current subscriber to the content service offered by the second VOD provider. Here, the user may choose to become a new subscriber via the broadcast content provider. To entice the user to become a subscriber, the second VOD provider and/or the broadcast content provider may offer a trial subscription at a limited price and/or duration. A second active region 422 may be provided such that in response to the user's selection, the user becomes a trial subscriber under the trial subscription conditions (not shown). Then, the user's media device 102 may become reconfigured to provide immediate access to and presentation of the media content event provided by the second VOD provider.

Further, the second page 402 of the content queue 106 further presents content attribute information 424 that indicates that a fourth content source ("Content Source m") currently provides VOD access, via the broadcast content providers' network, to the first indicated media content event. Here, the user appreciates that this fourth access option is from a third VOD provider who is providing content delivered by the broadcast content provider's broadcast system 204 (FIG. 2). The name of the fourth VOD provider may be described (and optionally other information, such as a channel identifier associated with this first VOD provider). Further, the content attribute information 424 indicates that the format of the first indicated media content event is in high definition (HD), that it can be accessed for free as part of the user's service subscription with the broadcast content provider, and indicates that commercials are present in the media content event, and indicates that trick functions (such as fast forward, rewind, etc.) are disabled.

An active region 426 is provided so that the user may order the first indicated media content event from the first VOD provider when the media content event becomes available from that particular VOD provider. One skilled in the art appreciates that the presence of commercials may be acceptable to the user in view of the free access charges to the media content event. Here, selection of the active region 426 will cause the user's media device 102 to immediately access the media content event for presentation. Because the trick functions are disabled, the user understands that they will have to view the commercials during presentation of the media content event.

Figure 5:
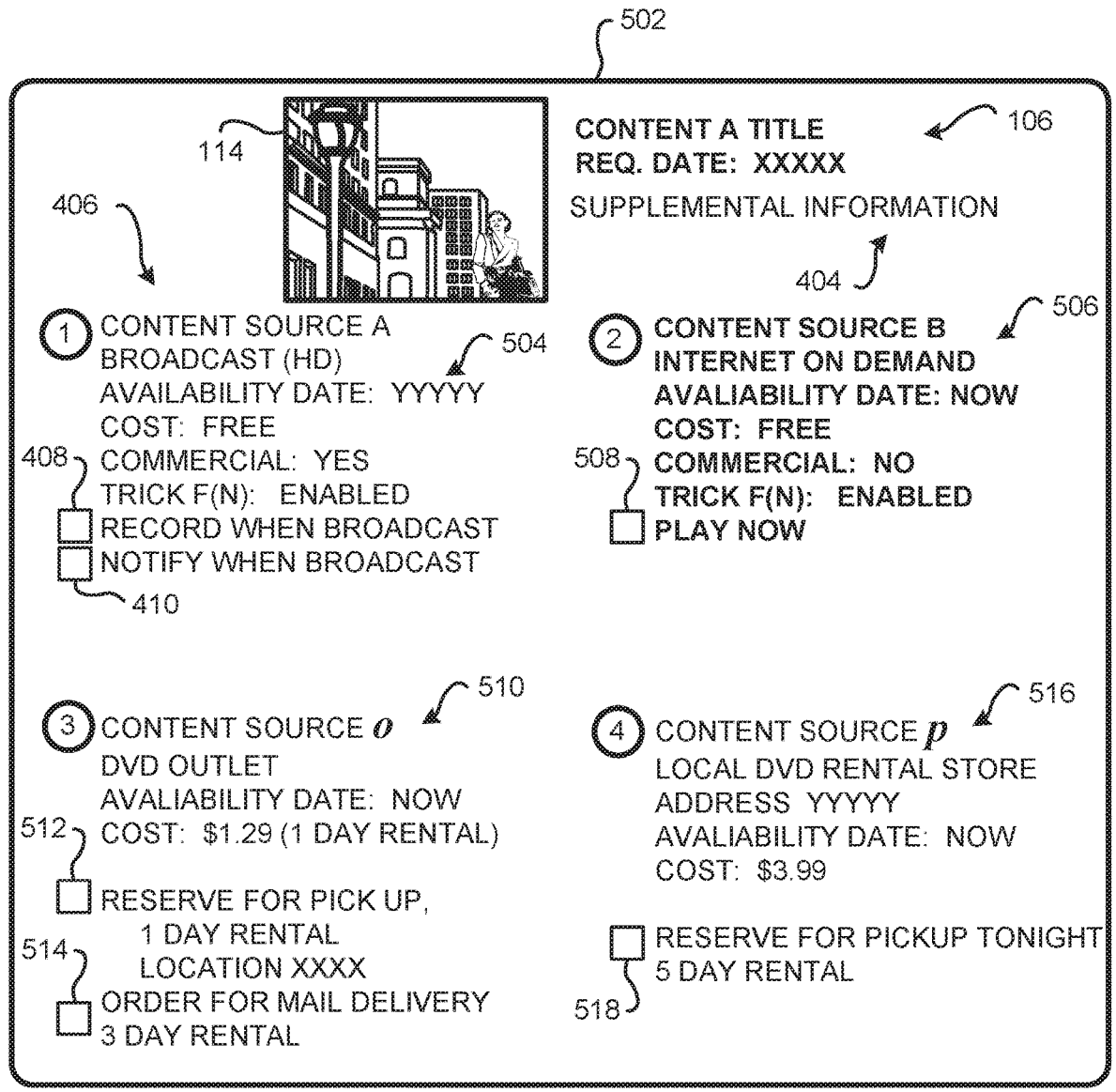
FIG. 5 is a later presented and updated second page of an example content queue that shows a greater detail of information about a particular user-specified media content event that is included in the user's watch list.

FIG. 5 is a later presented and updated second page 502 of an example content queue 106 that shows a greater detail of information about a particular user-specified media content event that is included in the user's watch list. As noted herein, the content queue 106 is updated such that the viewing user is able to view and understand a plurality of different viewing choices for the media content events included in their watch list. The updated second page 502 hypothetically illustrates that access choices to view the first indicated media content event (see FIG. 1) have changed from the earlier presented second page 402 (FIG. 4). Here, in response to the user selection of the focused-to first indicated media content event shown on the first page of the content queue 106 (see FIG. 1), the updated additional information indicating a plurality of current access choices for accessing the first indicated media content event are presented to the user.

Similar to the hypothetical example second page 402 (FIG. 4), the second page 502 indicates the text 144a and the optional graphical element 146a that is associated with the first indicated media content event. Additional supplemental information 404 stored in the media content event queue data 104 may also be indicated. In the simplified hypothetical second page 502 of the content queue 106 illustrated in FIG. 5, information about four of the six content providers or sources that can provide access to the first indicated media content event are shown on this example second page 502. It is appreciated that a paging function, scrolling function or the like may be used to later show information about the two remaining content providers or sources (noting that the first page of the content queue 106 shown in FIG. 1 continues, in this simplified hypothetical example, to indicate that the first indicated media content event continues to be available from six content providers or sources).

The second page 402 of the content queue 106 presents content attribute information 406 that indicates that the same first content source (conceptually illustrated as "Content Source A") currently provides access to the first indicated media content event. Here, the content attribute information 406 is substantially the same as or is similar to the previously described content attribute information 406 in FIG. 4. However, a different broadcast date 504 ("YYYYY") is indicated. Here, one skilled in the art understands that the broadcast of the first indicated media content event by the broadcasting first content source has already occurred, and that a new date 504 corresponds to an updated re-broadcast date for the first indicated media content event.

Similarly, the second page 402 of the content queue 106 presents content attribute information 506 that indicates that the same second content source (conceptually illustrated as "Content Source B") currently provides access to the first indicated media content event on an on-demand basis via its VOD system. Here, the content attribute information 506 is substantially the same as or is similar to the previously described content attribute information 412 in FIG. 4. However, the content attribute information 506 indicates a current availability of the first indicated media content event (in contrast to the content attribute information 412 which indicated availability of the first indicated media content event at some future time, namely, "next week"). Here, one skilled in the art understands that the first indicated media content event is now available from the second content source.

Further, in contrast to the content attribute information 412 of FIG. 4, access regions have been updated to reflect current relevant access options available to the user. Here, the previously presented active regions 414 and 416 are no longer relevant access options since the first indicated media content event is currently available from the second content source. A now-relevant active region 508 is provided so that the user can immediately access the first indicated media content event from the second content source (here, the first VOD provider). Here, selection of the active region 508 will cause the user's media device 102 to immediately access the media content event for presentation.

One skilled in the art appreciates that since this access to the first indicated media content event is provided without commercials and has no access charges (free), that this access method may be a preferred access method over other alternative available access methods (which have access charges and/or have commercials). Embodiments of the media content event quick access queue system 100 may be optionally configured to identify a potential preferred access method based on user preferences and/or other predefined criteria, and then may indicate an access recommendation to the user. To conceptually illustrate an access recommendation, the text of the content attribute information 506 is illustrated using a bold font. Any suitable highlighting method, such as a text color, a background shading, and/or an illumination intensity change (brightness adjustment) may be used to indicate an access option that is being presented as a recommended access option to the user. Here, the access recommendation is made since the access is immediate and is free of charge to the user.

Some embodiments of the media content event quick access queue system 100 may be optionally configured to learn user preferences for preferred access options. The media content event queue logic 314 (FIG. 3) may optionally include a suitable learning algorithm that, after some duration of user actions and/or selections made via the content queue 106, learns one or more user preferences. For example, the user may have previously selected the second content source (Content Source B) over other access options a plurality of times. After the number of times that the user has selected the second content source over other access options, the media content event quick access queue system 100 learns of the user's preference for the first VOD content provider. That is, if the user selected the first VOD content provider a number of times over a predefined threshold number of times and/or over a predefined duration, then the media content event quick access queue system 100 learns of the user's preference for the first VOD content provider. Accordingly, an access recommendation can be made to the user when the content queue 106 is presented when the media content event is currently accessible from the first VOD content provider.

The updated second page 502 hypothetically illustrates that access choices to view the first indicated media content event (see FIG. 1) have changed from the earlier presented second page 402 (FIG. 4). Here, a new content provider (Content Source O) is indicated by the content attribute information 510. The content attribute information 510 is illustrated as replacing the content attribute information 418 (FIG. 4) associated with the third content provider. Here, one skilled in the art appreciates that the particular sorting used for presentation of the content queue 106 may have resulted in the above-described change in the presented content attribute information 510. Alternatively, or additionally, it may be possible that the third content provider indicated in the content attribute information 418 of the earlier presented second page 402 may no longer be providing access to the first indicated media content event of the user's watch list. Alternatively, or additionally, this new content provider may have become a higher preferred access alternatively based on the user's preferences. Alternatively, or additionally, this new content provider may not have been able to provide access to the first indicated media content event at the time that the earlier second page 402 was presented to the user. Any suitable reasoning may have resulted in the hypothetical change in the second page 502.

Here, the user appreciates that this third current access option is from a content provider that provides the media content event that has been stored on a physical memory medium. The name of the content provider may be described (and optionally other information, such as a location or address of the content provider). Further, the content attribute information 510 indicates that first indicated media content event will be accessed via a DVD, indicates that the DVD is currently available, and indicates that the DVD can be rented for a cost ($1.29) for a one-day rental.

A first active region 512 is provided so that the user may reserve a DVD with the first indicated media content event for pickup at the indicated location or address, and that the rental cost is for a one-day rental period. One skilled in the art appreciates that a DVD may be a desirable user preference and may even be desirable enough to offset the user's effort of physically travelling to the location to pick up the DVD. In response to selecting the active region 512, the GUI managing the DVDs for the content provider is accessed, preferably using the browser 312 (FIG. 3) of the media device 102. The media content event quick access queue system 100 then operates to automatically "reserve" the DVD for the later pick up by the user. Here, the user does not need to separately access the GUI managing the DVDs for the content provider. The user simply has to travel to the indicated location or address to pick up their DVD rental.

Alternatively, or additionally, the DVD may be available for the content provided via a postal service, a mail service, or another suitable delivery service (for example, a drone-based delivery service or courier service). In response to selecting the active region 514, the GUI managing the DVDs for the content provider is accessed, preferably using the browser 312 (FIG. 3) of the media device 102. The media content event quick access queue system 100 then operates to automatically "order" the DVD for the user. Here, the user does not need to separately access the GUI managing the DVDs for the content provider. The user simply has to monitor the designated delivery location for the upcoming delivery of their DVD rental. One skilled in the art appreciates that the access conditions and/or cost may be different for this access alternative (as compared to the described hypothetical DVD pick-up access conditions and access cost), and as such, such differences may be optionally indicated in the content attribute information 510.

Additionally, a new content provider (Content Source p) is indicated by the content attribute information 516. The content attribute information 516 is illustrated as replacing the content attribute information 424 (FIG. 4) associated with the fourth content provider. Here, one skilled in the art appreciates that the particular sorting used for presentation of the content queue 106 may have resulted in the above-described change in the presented content attribute information 516, that it may be possible that the fourth content provider indicated in the content attribute information 424 of the earlier presented second page 402 may no longer be providing access to the first indicated media content event of the user's watch list, that this new content provider may have become a higher preferred access alternatively based on the user's preferences, and/or that this new content provider may not have been able to provide access to the first indicated media content event at the time that the earlier second page 402 was presented to the user. Any suitable reasoning may have resulted in the hypothetical change in the second page 502.

Here, the user appreciates that this fourth current access option is from another content provider that also provides the media content event that has been stored on a physical memory medium. The name of the content provider may be described (and optionally other information, such as a location or address of the content provider). Further, the content attribute information 516 indicates that first indicated media content event will be accessed via a DVD, indicates that the DVD is currently available, and indicates that the DVD can be rented for a cost ($3.29) for a five-day rental. Further, the user understands that the fourth content provider will not provide DVDs through the mail or other delivery system (since there is no ordering option indicated by an active hot spot).

Here, a single active region 518 is provided so that the user may reserve a DVD with the first indicated media content event for pickup at the indicated location or address, and that the rental cost is for a five-day rental period. One skilled in the art appreciates that a relatively long rental period for a DVD may be a desirable user preference and may even be desirable enough to offset the user's effort of physically travelling to the location to pick up the DVD. In response to selecting the active region 518, the GUI managing the DVDs for the fourth content provider is accessed, preferably using the browser 312 (FIG. 3) of the media device 102. The media content event quick access queue system 100 then operates to automatically "reserve" the DVD for the later pick up by the user. Here, the user does not need to separately access the GUI managing the DVDs for the content provider. The user simply has to travel to the indicated location or address to pick up their DVD rental.

In some embodiments, when access options change for a particular one of the media content events of the user's watch list, a notification indicating the change in the one or more access options is generated and is then communicated to the user. For example, the media device 102 may generate a notification that is presented on the display 114 of the media presentation system 108 (FIG. 1). Alternatively, or additionally, the generated notification may be communicated to another electronic device for presentation to the user. For example, the access option change notification may be presented on the user's cell phone, smart phone, tablet, and or computer.

The access option change notification may be presented periodically, when a change in any access option occurs, and/or when a change to a preferred access options occurs. Such access option change notification may be presented under any suitable conditions depending upon the configuration of the media content event quick access queue system 100. The notification conditions may be predefined by a third party, such as the broadcast content provider who is responsible for managing operation of the media device 102. Alternatively, or additionally, the user may specify the notification conditions based on their personal preferences.

In the various embodiments, one skilled in the art appreciates that the different content providers may identify their available media content events using a variety of different techniques. Further, the data formats used by these different proprietary GUIs may vary from one content provider to another. In the various embodiments of the media content event quick access queue system 100, the media device 102 maintains a table structure or other suitable data structure wherein the data of interest used to generate and present the content queue 106 can be obtained from the variety of different information sources regardless of the particular format that is used for the information.

For example, the user may use the Internet feature of their television 110 to access a particular content provider. Since the remote control 130 is configured to operate both the media device 102 and the television 110, the media device 102 is configured by the media content event quick access queue system 100 to "learn" the steps (and associated commands) necessary to access that particular content provider's proprietary VOD GUI system, and to access a media content event from the content provider's proprietary VOD GUI system. Here, operation of one or more of the controllers 132 of the remote control 130 will configure the remote control to operate in a learning mode. As the user steps through the process of accessing a particular media content event from the content provider's proprietary VOD GUI system, the media device 102 tracks and records the various commands (and their entry sequence) entered by the user. Once the user has completed the access process, the learning mode is disabled by the user (preferably using one or more of the controllers 132).

In a hypothetical application, the user actuates a controller 132 on their remote control 130 to cause, for example, their television 110 to access the Internet (FIG. 1). The remote control 130 communicates a first wireless signal 134 with information corresponding to the actuated controller and/or command instructions that causes the television to access the Internet in response to the television detecting the first wireless signal 134. Here, the media device 102 concurrently detects the same communicated first wireless signal 134 (after being configured to operate in the above-described learning mode). Information corresponding to this first detected wireless signal 134 is saved by the remote control.

When the television 110 accesses the Internet, an Internet navigation GUI is typically presented which displays a plurality of graphical icons that are each associated with one of a plurality of internet sites that the user can navigate to and focus on. Assuming that the Internet VOD content provider is shown on the presented Internet navigation GUI, the user may enter a plurality of actuation to directional controllers 132 on their remote control 130 to navigate to the graphical icon associated with the Internet VOD content provider of interest. Here, a plurality of navigations commands are communicated to the TV 110 as a series of second wireless signals 134 which cause the TV 110 to move the focus onto the graphical icon of the Internet VOD content provider of interest. The media device 102 also detects the second series of wireless signals 134 and saves corresponding information associated with the navigation commands issued from the remote control 130. For example, the user may have to actuate a left direction controller 132 and then a downward direction controller to move the focus once to the left and once to the right to change focus to the graphical icon corresponding to the VOD content provider of interest. Here, media device 102 also detects the left and the downward focus movement commands of the second series of wireless signals 134, and then saves corresponding information associated with the leftward and the downward navigation commands issued from the remote control 130.

Next, the user would actuate another controller 132 to cause a selection of the currently focused to graphical icon associated with the VOD content provider of interest. In response to a third wireless signal 134 issued from the remote control 130, the TV 110 would initiate a communication link or other suitable Internet-based connection to the Internet content source 232 (such as an Internet site or other suitable remote site as described in FIG. 2) operated by the VOD content provider of interest. The media device 102 also detects the third wireless signal 134 and saves corresponding information associated with the selection command issued from the remote control 130.

Next, the proprietary search and media content event listing system provides a proprietary VOD GUI that is presented on the display 114 of the TV 110. The user can then visually see the accessible media content events that are available to the media device from that particular Internet VOD content provider. Often, the initially presented proprietary VOD GUI does not provide a listing of all available media content events (and any associated access conditions and/or costs). For example, the initially presented proprietary VOD GUI may indicate a plurality of different content genres or classifications that the user may focus on and then select. For example, groupings of comedies, action films, recently watched, newly available media content events, or the like may be indicated on the initially presented proprietary VOD GUI. Accordingly, the user must next operate a plurality of controllers 132 on their remote control 130 to move the focus on the proprietary VOD GUI to an option that cause a listing of all available media content events. Each time the user actuates one of the controllers 132, a wireless signal 134 is emitted from the remote control 130 that is detected by both the television 110 and the media device 102. The media device 102 saves corresponding information associated with the navigation commands and the selection commands in the detected wireless signals 134 issued from the remote control 130.

Once the user has navigated about the initially presented proprietary VOD GUI and has caused presentation of a second proprietary VOD GUI which lists all available media content events, the user may actuate another controller 132 or 136 to cause an ending of the learning function being performed by the media device 102.

Based on the above-described series of user commands entered by the user by the serial actuation of the controllers 132 of their remote control 130, the media device 102 generates an emulated command list that is associated with that Internet VOD content provider. When the media device 102 later performs an access update, the media device 102 simply generates and communicates the commands of the emulated command list to the TV 110 and/or to the internet content source 232, thereby obtaining access to the Internet VOD content provider's proprietary VOD GUI system. Once the electronic information that is used to present a proprietary VOD GUI which lists all available media content events from that particular VOD content provider of interest is accessed by the media device 102, the accessed information may be compared with the user-specified list of media content events stored in the media content event queue data 104, and then the access information may then be incorporated into the media content event queue data 104 for each of the user-specified media content events.

Further, when the second page of the content queue 106 is presented to the user which indicates accessibility of a particular media content event on their watch list from this particular Internet VOD content provider, the media device 102 may identify and create the appropriate active regions (hot spots) shown on the content queue 106 that provides the user access selection options described herein. As noted above, selection of an active region causes a particular predefined operation that is performed by the media device 102. The operating instructions associated with the operation are determined based on the above-described learning process (or at least from another similar learning process). Thus, a user selection of a particular available active region may cause immediate access to a media content event of interest that is accessible from that particular Internet VOD content provider.

It should be emphasized that the above-described embodiments of the media content event quick access queue system 100 are merely possible examples of implementations of the invention. Many variations and modifications may be made to the above-described embodiments. All such modifications and variations are intended to be included herein within the scope of this disclosure and protected by the following claims.

What is claimed:

1. A system comprising:
one or more processing devices; and
memory communicatively coupled with and readable by the one or more processing devices and having stored therein processor-readable instructions which, when executed by the one or more processing devices, cause the one or more processing devices to perform operations comprising:
receiving one or more user specifications corresponding to user input that is indicative of one or more media content events;
identifying one or more media content events corresponding to the one or more user specifications;
identifying different content sources that provide access to a first media content event of the one or more media events identified as corresponding to the one or more user specifications;
causing presenting on a display of a listing that indicates one or more media content events identified as corresponding to the one or more user specifications;
receiving user selections for accessing the first media content event from a selected content source from the different content sources that provide access to the first media content event;
tracking and recording one or more commands and one or more corresponding entry sequences from the user selections, where the one or more entry sequences correspond to logging into the selected content source and accessing content from the selected content source, where the selected content source is learned to be a preferred content source;
receiving at least one subsequent user selection corresponding to a second media content event; and
responsive to the at least one subsequent user selection, performing one or more learned operations and the recorded one or more entry sequences associated with accessing the selected content source, where the one or more learned operations comprise using the recorded one or more entry sequences to facilitate access to the second media content event from the selected content source.

2. The system as recited in claim 1, where the one or more learned operations allow for immediate access to the second media content event from the selected content source so that a user does not need to make the one or more learned operations to access the second media content event from the selected content source.

3. The system as recited in claim 2, where the one or more learned operations cause the second media content event to be played.

4. The system as recited in claim 3, where the one or more learned operations at least partially correspond to accessing a graphical user interface system of the selected content source.

5. The system as recited in claim 1, the operations further comprising:
after the selected content source is learned to be the preferred content source, identifying the selected content source as the preferred content source in one or more subsequent listings presented to a user.

6. The system as recited in claim 1, the operations further comprising:
generating an emulated command list that is associated with the selected content source; and
using the emulated command list in identifying the second media content event.

7. The system as recited in claim 1, the operations further comprising:
receiving a plurality of selections corresponding to a second content source of the different content sources;
determining, based at least in part on the plurality of selections, the second content source to be a most often used content source; and
identifying the selected content source as the most often used content source in one or more subsequent listings presented to a user.

8. One or more non-transitory, machine-readable media having machine-readable instructions thereon which, when executed by one or more processing devices, cause the one or more processing devices to perform operations, the operations comprising:
receiving one or more user specifications corresponding to user input that is indicative of one or more media content events;
identifying one or more media content events corresponding to the one or more user specifications;
identifying different content sources that provide access to a first media content event of the one or more media events identified as corresponding to the one or more user specifications;
causing presenting on a display of a listing that indicates one or more media content events identified as corresponding to the one or more user specifications;
receiving selections for accessing the first media content event from a selected content source from the different content sources that provide access to the first media content event;
tracking and recording one or more commands and one or more corresponding entry sequences from the user selections, where the one or more entry sequences correspond to logging into the selected content source and accessing content from the selected content source, where the selected content source is learned to be a preferred content source;
receiving at least one subsequent user selection corresponding to a second media content event; and
responsive to the at least one subsequent user selection, performing one or more learned operations and the recorded one or more entry sequences associated with accessing the selected content source, where the one or more learned operations comprise using the recorded one or more entry sequences to facilitate access to the second media content event from the selected content source.

9. The one or more non-transitory, machine-readable media as recited in claim 8, where the one or more learned operations allow for immediate access to the second media content event from the selected content source so that a user does not need to make the one or more learned operations to access the second media content event from the selected content source.

10. The one or more non-transitory, machine-readable media as recited in claim 9, where the one or more learned operations cause the second media content event to be played.

11. The one or more non-transitory, machine-readable media as recited in claim 10, where the one or more learned operations at least partially correspond to accessing a graphical user interface system of the selected content source.

12. The one or more non-transitory, machine-readable media as recited in claim 8, the operations further comprising:
after the selected content source is learned to be the preferred content source, identifying the selected content source as the preferred content source in one or more subsequent listings presented to a user.

13. The one or more non-transitory, machine-readable media as recited in claim 8, the operations further comprising:
generating an emulated command list that is associated with the selected content source; and
using the emulated command list in identifying the second media content event.

14. The one or more non-transitory, machine-readable media as recited in claim 8, the operations further comprising:
receiving a plurality of selections corresponding to a second content source of the different content sources;
determining, based at least in part on the plurality of selections, the second content source to be a most often used content source; and
identifying the selected content source as the most often used content source in one or more subsequent listings presented to a user.

15. A method comprising:
receiving one or more user specifications corresponding to user input that is indicative of one or more media content events;
identifying one or more media content events corresponding to the one or more user specifications;
identifying different content sources that provide access to a first media content event of the one or more media events identified as corresponding to the one or more user specifications;
causing presenting on a display of a listing that indicates one or more media content events identified as corresponding to the one or more user specifications;
receiving selections for accessing the first media content event from a selected content source from the different content sources that provide access to the first media content event;
tracking and recording one or more commands and one or more corresponding entry sequences from the user selections, where the one or more entry sequences correspond to logging into the selected content source and accessing content from the selected content source, where the selected content source is learned to be a preferred content source;
receiving at least one subsequent user selection corresponding to a second media content event; and
responsive to the at least one subsequent user selection, performing one or more learned operations and the recorded one or more entry sequences associated with accessing the selected content source, where the one or more learned operations comprise using the recorded one or more entry sequences to facilitate access to the second media content event from the selected content source.

16. The method as recited in claim 15, where the one or more learned operations allow for immediate access to the second media content event from the selected content source so that a user does not need to make the one or more learned operations to access the second media content event from the selected content source.

17. The method as recited in claim 16, where the one or more learned operations cause the second media content event to be played.

18. The method as recited in claim 17, where the one or more learned operations at least partially correspond to accessing a graphical user interface system of the selected content source.

19. The method as recited in claim 15, further comprising:
after the selected content source is learned to be the preferred content source, identifying the selected content source as the preferred content source in one or 4 more subsequent listings presented to a user.

20. The method as recited in claim 15, further comprising:
generating an emulated command list that is associated with the selected content source; and
using the emulated command list in identifying the second media content event.

* * * * *